US010140776B2

(12) United States Patent
Schwarz et al.

(10) Patent No.: US 10,140,776 B2
(45) Date of Patent: Nov. 27, 2018

(54) ALTERING PROPERTIES OF RENDERED OBJECTS VIA CONTROL POINTS

(71) Applicants: Julia Schwarz, Redmond, WA (US); Bharat Ahluwalia, Redmond, WA (US); David Calabrese, Bellevue, WA (US); Robert C J Pengelly, Seattle, WA (US); Yasaman Sheri, Seattle, WA (US); James Tichenor, Seattle, WA (US)

(72) Inventors: Julia Schwarz, Redmond, WA (US); Bharat Ahluwalia, Redmond, WA (US); David Calabrese, Bellevue, WA (US); Robert C J Pengelly, Seattle, WA (US); Yasaman Sheri, Seattle, WA (US); James Tichenor, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/181,250

(22) Filed: Jun. 13, 2016

(65) Prior Publication Data

US 2017/0358144 A1    Dec. 14, 2017

(51) Int. Cl.
*G06T 19/20*    (2011.01)
*G06F 3/01*    (2006.01)
(Continued)

(52) U.S. Cl.
CPC ............ *G06T 19/20* (2013.01); *G06F 3/011* (2013.01); *G06F 3/013* (2013.01); *G06F 3/017* (2013.01);
(Continued)

(58) Field of Classification Search
CPC .................................................. G06T 19/006
(Continued)

(56) References Cited

U.S. PATENT DOCUMENTS 6,031,519 A    2/2000    O'Brien
7,054,045 B2    5/2006    McPheters et al.
(Continued)

FOREIGN PATENT DOCUMENTS

WO    2016089637 A1    6/2016

OTHER PUBLICATIONS

"Becoming Iron Man, thanks to Meta", Retrieved on: Mar. 12, 2016, Available at: <<http://legacy.wbir.com/video/4783099520001/1/Becoming-Iron-Man-thanks-to-Meta>>, 2 pages.
(Continued)

*Primary Examiner* — Javid A Amini
(74) *Attorney, Agent, or Firm* — Jacob P. Rohwer; Newport IP, LLC

(57) ABSTRACT

Altering properties of rendered objects and/or mixed reality environments utilizing control points associated with the rendered objects and/or mixed reality environments is described. Techniques described can include detecting a gesture performed by or in association with a control object. Based at least in part on detecting the gesture, techniques described can identify a target control point that is associated with a rendered object and/or a mixed reality environment. As the control object moves within the mixed reality environment, the target control point can track the movement of the control object. Based at least in part on the movement of the control object, a property of the rendered object and/or the mixed reality environment can be altered. A rendering of the rendered object and/or the mixed reality environment can be modified to reflect any alterations to the property.

20 Claims, 19 Drawing Sheets

(51) Int. Cl.
    *G06T 19/00*     (2011.01)
    *G06F 3/0484*     (2013.01)
    *G06T 15/60*     (2006.01)

(52) U.S. Cl.
    CPC ...... *G06F 3/04842* (2013.01); *G06F 3/04845* (2013.01); *G06T 15/60* (2013.01); *G06T 19/006* (2013.01); *G06T 2219/20* (2013.01); *G06T 2219/2004* (2013.01); *G06T 2219/2016* (2013.01)

(58) Field of Classification Search
    USPC .......................................................... 345/633
    See application file for complete search history.

(56) References Cited

U.S. PATENT DOCUMENTS

| | | | |
|---|---|---|---|
| 2004/0193413 A1* | 9/2004 | Wilson | G06F 3/017 704/243 |
| 2008/0030499 A1* | 2/2008 | Wanda | G06F 3/011 345/419 |
| 2009/0217211 A1* | 8/2009 | Hildreth | G06F 3/017 715/863 |
| 2011/0096072 A1 | 4/2011 | Kim et al. | |
| 2011/0289455 A1 | 11/2011 | Reville et al. | |
| 2012/0113223 A1* | 5/2012 | Hilliges | G06F 3/00 348/46 |
| 2012/0204133 A1* | 8/2012 | Guendelman | G06F 3/017 715/863 |
| 2013/0006957 A1* | 1/2013 | Huang | G06F 3/017 707/706 |
| 2013/0021491 A1* | 1/2013 | Lee | H04N 19/56 348/222.1 |
| 2014/0152558 A1 | 6/2014 | Salter et al. | |
| 2014/0168261 A1 | 6/2014 | Margolis et al. | |
| 2014/0184644 A1* | 7/2014 | Sharma | G06F 3/017 345/633 |
| 2014/0201689 A1* | 7/2014 | Bedikian | G06F 3/011 715/863 |
| 2014/0282267 A1 | 9/2014 | Vogelmeier et al. | |
| 2014/0306891 A1 | 10/2014 | Latta et al. | |
| 2015/0227210 A1* | 8/2015 | Chen | G06F 3/016 345/156 |
| 2016/0019718 A1 | 1/2016 | Mukkamala et al. | |
| 2017/0068119 A1* | 3/2017 | Antaki | H04N 5/2251 |

OTHER PUBLICATIONS

Liu, et al., "Two-Finger Gestures for 6DOF Manipulation of 3D Objects", In Proceedings of 20th Pacific Conference on Computer Graphics and Applications, vol. 31, No. 7, Sep. 12, 2012, pp. 2047-2055.

"What is the Definition & Meaning of Mixed Reality or MR?", Published on: Feb. 9, 2016 Available at: <<http://allvirtualreality.com/tutorials/what-is-definition-meaning-mixed-reality-mr.html>>, 2 pages.

"International Search Report and Written Opinion Issued in PCT Application No. PCT/US2017/036923", dated Oct. 6, 2017, 17 Pages.

* cited by examiner

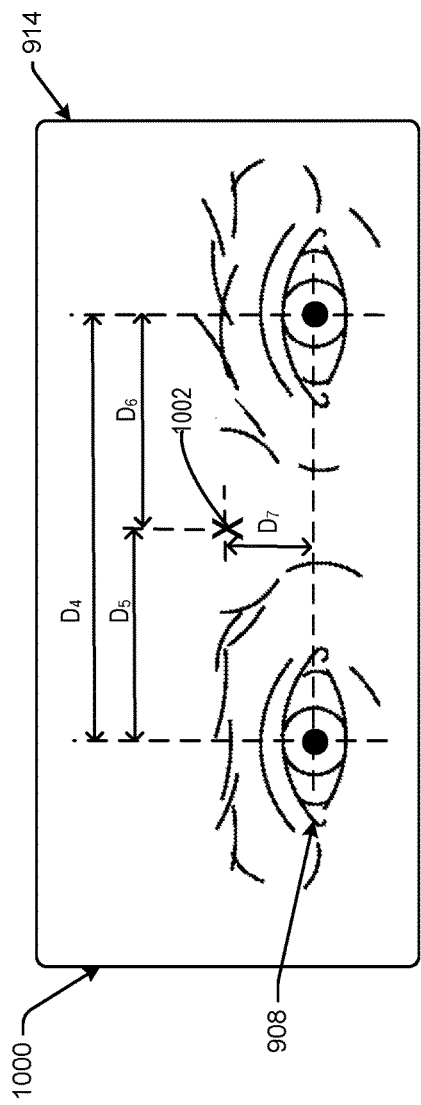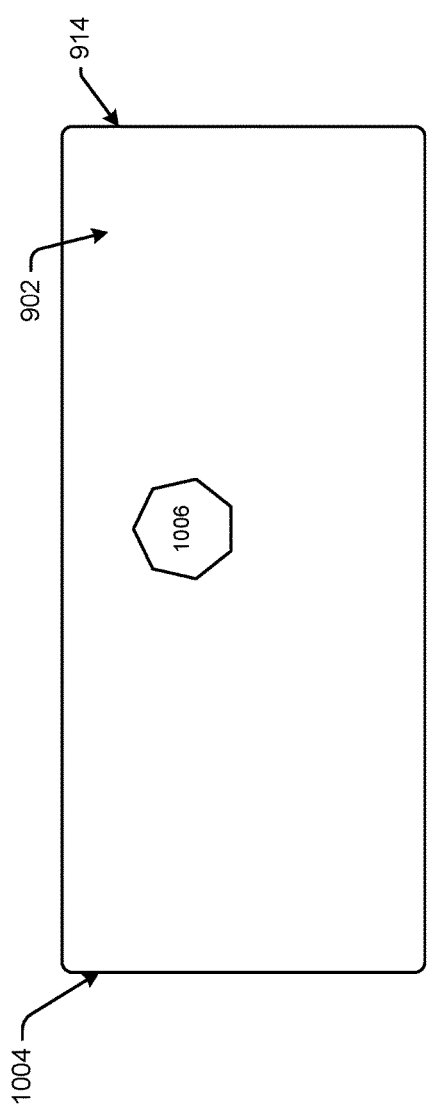

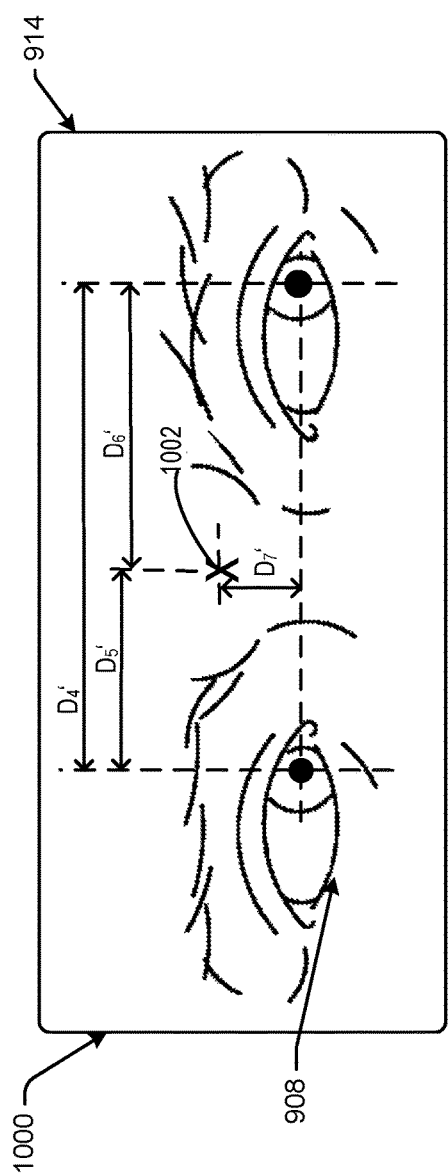
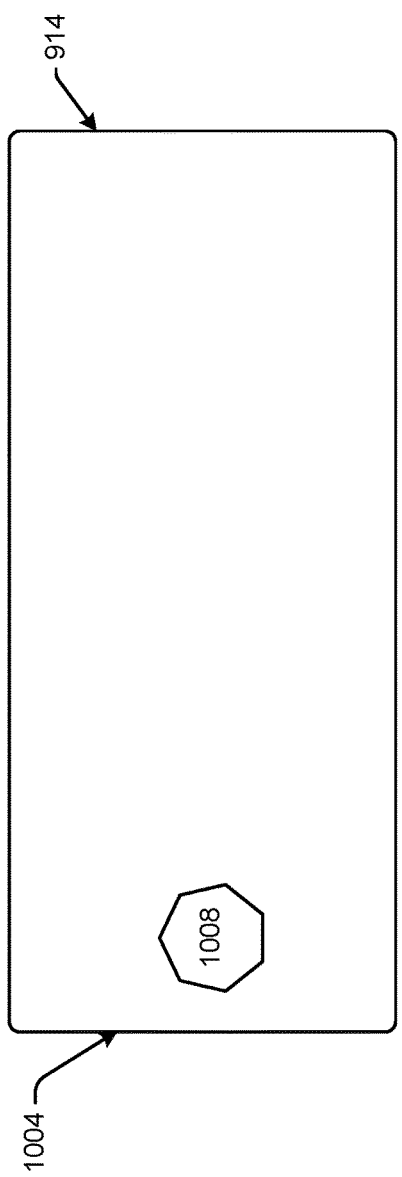

ALTERING PROPERTIES OF RENDERED OBJECTS VIA CONTROL POINTS

BACKGROUND

Computing systems can generate new environments including virtual reality environments and/or mixed reality environments. Virtual reality is an immersive experience, which simulates physical presence in a real or imagined environment. For example, a virtual reality environment can immerse a physical, real-world person with computer-generated graphics (e.g., a dog, a castle, etc.) in a computer-generated, virtual scene via a virtual reality display device. Mixed reality is a hybrid reality experience, which merges real worlds and virtual worlds. Mixed reality is a technology that produces mixed reality environments where a physical, real-world person and/or objects in physical, real-world scenes co-exist with virtual, computer-generated people and/or objects in real time. For example, a mixed reality environment can augment a physical, real-world scene and/or a physical, real-world person with computer-generated graphics (e.g., a dog, a castle, etc.) in the physical, real-world scene viewed via a mixed reality display device.

Current technologies enable physical, real-world persons to interact with computer-generated objects via various interactions. For instance, in some examples, computer-generated objects can be controlled within a mixed reality environment by detecting hand-to-object gestures. In such examples, detected hand-to-object gestures can correspond with various virtual interactions with computer-generated objects, such as a virtual move of a computer-generated object, a virtual rotation of a computer-generated object, a virtual bumping of a computer-generated object, etc. Generally, each virtual interaction can correspond to a unique hand-to-object gesture. As a result, current technologies can be confusing because multiple hand-to-object gestures are required for interacting with computer-generated objects.

SUMMARY

This disclosure describes techniques for altering properties of rendered objects and/or mixed reality environments utilizing control points associated with the rendered objects and/or mixed reality environments. Techniques described can include detecting a gesture performed by or in association with a control object. Based at least in part on detecting the gesture, techniques described can identify a target control point that is associated with a rendered object and/or a mixed reality environment. As the control object moves within the mixed reality environment, the target control point can track the movement of the control object. Based at least in part on the movement of the control object, a property of the rendered object and/or the mixed reality environment can be altered. A rendering of the rendered object and/or the mixed reality environment can be modified to reflect any alterations to the property.

In at least one example, techniques described herein can streamline current technologies that enable movement and/or altering of rendered objects and/or mixed reality environments by leveraging control points to alter properties of corresponding rendered objects and/or mixed reality environments. In at least one example, the techniques described herein can reduce the need for a computing system to identify a variety of hand-to-object gestures that each correspond to different functionalities. In contrast, techniques described herein can leverage detection of a single gesture performed by or in association with the control object (e.g., a pinch gesture) to identify a target control point. Based at least in part on identifying the target control point, subsequent movement of the control object can move the control point, which can enable the altering of one or more properties. As a result, the techniques described herein can conserve computational resources.

Furthermore, the techniques described herein can improve a user's interaction with a device by directing the point of interaction to a control point. As a result, the techniques described herein can reduce the number of inadvertent inputs and reduce the consumption of processing resources. Technical effects, other than those mentioned herein, can also be realized from an implementation of the technologies described herein.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 10A is a schematic diagram showing an example of a device being used to calibrate one or more devices.

FIG. 10B is a schematic diagram showing another example of a device being used to calibrate one or more devices.

FIG. 10C is a schematic diagram showing yet another example of a device being used to calibrate one or more devices.

FIG. 10D is a schematic diagram showing another example of a device being used to calibrate one or more devices.

DETAILED DESCRIPTION

Figure 1:
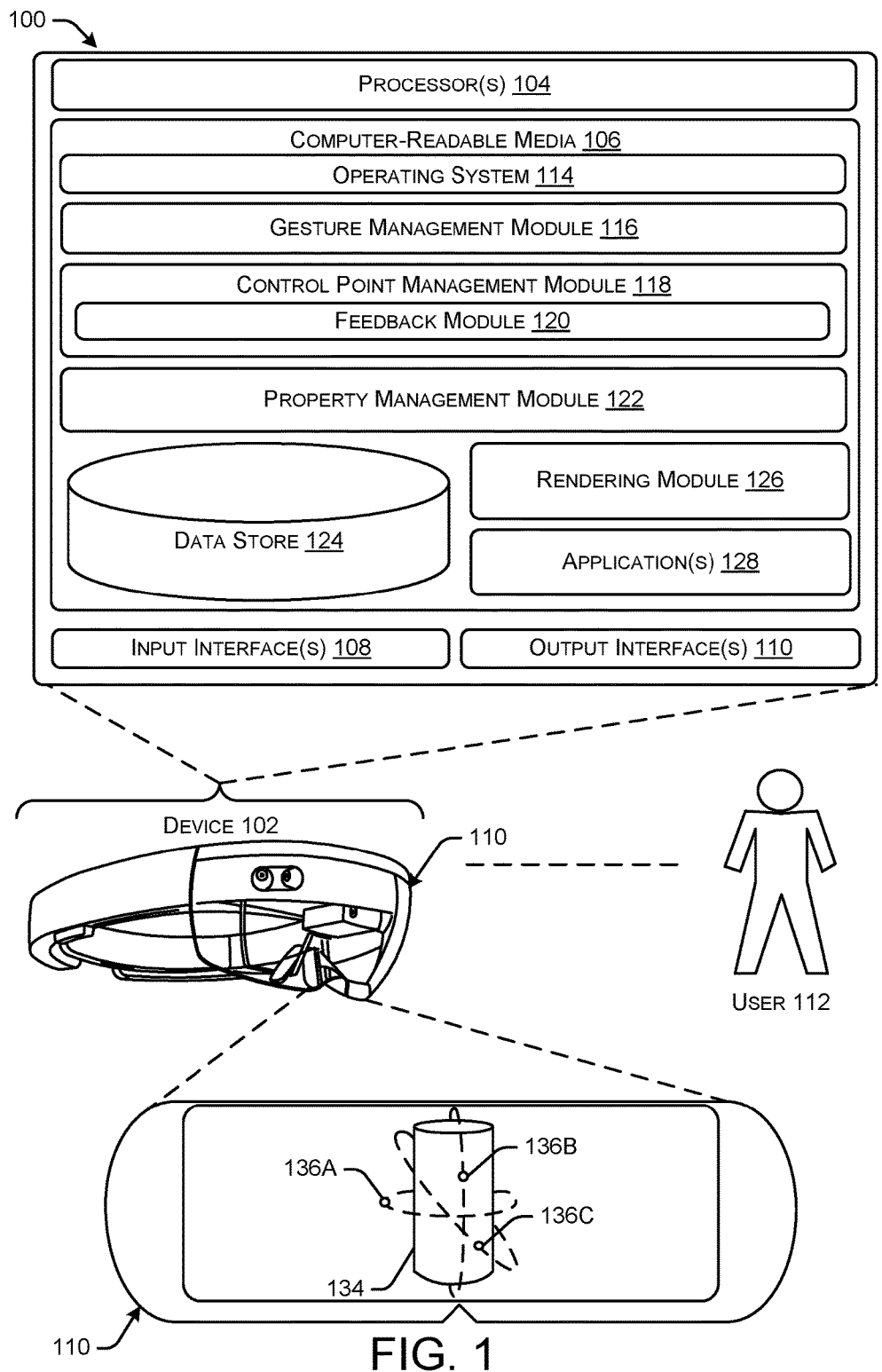
FIG. 1 is a schematic diagram showing an example environment for altering properties of rendered objects and/or mixed reality environments utilizing control points associated with the rendered objects and/or mixed reality environments.

This disclosure describes techniques for altering properties of rendered objects and/or mixed reality environments utilizing control points associated with the rendered objects and/or mixed reality environments. For illustrative purposes, a rendered object can be a rendering of any entity, including but not limited to, an item, a data, a device, a person, etc. The techniques described herein can present rendered objects via various technologies. In at least one example, the rendered objects can be presented via a display. In an example, the display can be a hardware display surface that can be configured to provide a real-world view of a real object through the hardware display surface while also displaying a rendered object, in an example of a mixed reality environment.

In at least one example, a rendered object can be associated with one or more properties. Each rendered object can be associated with one or more control points. For illustrative purposes, a control point can be a vertex of a rendered object, an edge of a rendered object, a control (e.g., a button, a slider, etc.) that is proximate to a rendered object, etc. In an example, a control can be proximate to a rendered object if it is positioned within a threshold distance of the rendered object. In at least one example, control points can be leveraged to alter one or more properties associated with one or more rendered objects. In some examples, a control point can alter one or more properties of a single rendered object. In other examples, a control point can alter one or more properties of a plurality of rendered objects. In additional and/or alternative examples, a control point can alter one or more properties of a mixed reality environment.

In at least one example, techniques described herein can detect a gesture performed by or in association with a control object. For illustrative purposes, a control object can be a body part (e.g., finger, hand, etc.) or an extension of a body part (e.g., a stylus, tweezers, etc.). In some examples, the control object can be a rendered object. In other examples, the control object can be a real object. In at least one example, the gesture can be a pinch. Additional and/or alternative gestures, however, can be imagined. Based at least in part on detecting the gesture performed by or in association with the control object, techniques described herein can identify a target control point associated with a rendered object. For illustrative purposes, a target control point can be a control point associated with a rendered object and/or a mixed reality environment that a control object can interact with to alter one or more properties associated with the rendered object and/or the mixed reality environment. As described below, the target control point can be determined using various considerations, including but not limited to, distance, gaze, context, etc.

Based at least in part on determining a target control point, techniques described herein can track movement of the control object and can cause the target control point to move with the movement of the control object. That is, techniques described herein can cause the movement of the target control point to track the movement of the control object. For illustrative purposes, movement of the control object, and corresponding movement of the target control point, can refer to movement along an x-axis, movement along a y-axis, movement along a z-axis, rotation around the x-axis, rotation around the y-axis, rotation around the z-axis, combinations of the foregoing, etc. In such examples, the x-axis, y-axis, and z-axis can be associated with a coordinate system or frame of reference.

In at least one example, the techniques described herein can alter a property associated with a rendered object based on the movement of the target control point. Examples of properties that can be altered include, but are not limited to, a scale of a rendered object, a three-dimensional structure of a rendered object, a position of a rendered object, a rotation of a rendered object, etc. In at least one example, the techniques described herein can modify a rendering of the rendered object to reflect changes to the rendered object caused by altering the property.

As a non-limiting example, a user can interact with a rendered object that is presented via a hardware display surface associated with a mixed reality environment. The user can perform a gesture near the rendered object. For instance, as a non-limiting example, a user can perform a pinch gesture and/or appear to reach out and grab a control point. Techniques described herein can detect the gesture and can determine a target control point associated with the rendered object. The user can move his or her hand around in the mixed reality environment. The target control point can track the movement of the user's hand. As the target control point moves around in the mixed reality environment, one or more properties associated with the rendered object can be modified. For instance, a user can move the target control point at an angle between the x-axis and the y-axis causing the rendered object to increase in size by a scale factor that is proportional to the displacement of the target control point. In such an example, the three-dimensional (3D) structure of the rendered object can change based on the scale factor. Alternatively, a user can move the target control point around the x-axis causing the rendered object to rotate around the x-axis proportional to the displacement of the target control point around the x-axis. In such examples, the 3D structure of the rendered object may not change, but the orientation of the rendered object can be different from the orientation of the rendered object pre-rotation. In yet an additional example, a user can move a target control point such to reposition a vertex of the rendered object causing the rendered object to deform based on the new position of the vertex. In such an example, the 3D structure of the rendered object can change based on the new position of the vertex.

In additional and/or alternative examples, control points can be associated with a mixed reality environment. In such examples, interaction with control points that are associated with an environment can modify one or more properties associated with the environment.

For instance, in a non-limiting example, a user can be interacting with an application that enables a simulation of a weather system in a mixed reality environment. A user can perform a gesture. For instance, as a non-limiting example, a user can perform a pinch gesture and/or appear to reach out and grab a control point. Techniques described herein can detect the gesture and can determine a target control point associated with the mixed reality environment. In a non-limiting example, the target control point can be associated with a wind property. The user can move his or her hand around in the mixed reality environment. The target control point can track the movement of the user's hand. As the target control point moves around in the mixed reality environment, the wind property associated with the mixed reality environment can be modified. For instance, movement of the target control point can alter an amount, a speed, a direction, etc. of the wind in the simulation of the weather system.

Techniques described herein can streamline current technologies that enable movement and/or altering of rendered objects and/or mixed reality environments by leveraging control points to alter properties of corresponding rendered objects and/or mixed reality environments. In at least one example, the techniques described herein can reduce the need for a computing system to identify a variety of hand-to-object gestures that each correspond to different functionalities. In contrast, techniques described herein can leverage detection of a single gesture performed by or in association with the control object (e.g., a pinch gesture) to identify a target control point. Based at least in part on identifying the target control point, subsequent movement of the control object can move the control point, which can enable the altering of one or more properties. As a result, the techniques described herein can conserve computational resources.

Furthermore, the techniques described herein can improve a user's interaction with a device by directing the point of interaction to a control point. As a result, the techniques described herein can reduce the number of inadvertent inputs and reduce the consumption of processing resources. Technical effects, other than those mentioned herein, can also be realized from an implementation of the technologies described herein.

It should be appreciated that the above-described subject matter can be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

As will be described in more detail herein, it can be appreciated that implementations of the techniques and technologies described herein can include the use of solid state circuits, digital logic circuits, computer component, and/or software executing on one or more devices. Signals described herein can include analog and/or digital signals for communicating a changed state, movement and/or any data associated with motion detection.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, wearable devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for altering properties of rendered objects utilizing control points associated with the rendered objects. In at least one example, the rendered objects can be provided via mixed reality environments, as described below, or virtual reality environments. Additionally, as will be described in more detail below, there are a number of applications and services that can embody the functionality and techniques described herein.

FIG. 1 illustrates an example environment 100 for altering properties of rendered objects and/or mixed reality environments utilizing control points associated with the rendered objects and/or mixed reality environments. More particularly, the example environment 100 can include a device 102 that includes processor(s) 104, computer-readable media 106, input interface(s) 108, and output interfaces(s) 110. Each device 102 can correspond to a user 112. In FIG. 1, device 102 is illustrated as a head-mounted device. However, device 102 can be any type of device configured to present rendered objects. As will be described in detail, techniques described herein can involve any number of devices 102 and/or type of devices 102 that are configured to present rendered objects. This example is provided for illustrative purposes and is not to be construed as limiting. Additional details associated with example environment 100 are described below with reference to FIGS. 13-15.

Processor(s) 104 can represent, for example, a CPU-type processing unit, a GPU-type processing unit, a HPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-On-a-Chip Systems (SOCs), Complex Programmable Logic Devices (CPLDs), etc. In various examples, the processor(s) 104 can execute one or more modules and/or processes to cause the device 102 to perform a variety of functions, as set forth above and explained in further detail in the following disclosure. Additionally, each of the processor(s) 104 can possess its own local memory, which also can store program modules, program data, and/or one or more operating systems. Additional details associated with the processor(s) 104 are described below with reference to FIGS. 13 and 15.

In at least one configuration, the computer-readable media 106 of the device 102 can include components that facilitate interaction between the user 112 and the device 102. For example, the computer-readable media 106 can include an operating system 114, a gesture management module 116, a control point management module 118, a feedback module 120, a property management module 122, a data store 124, a rendering module 126, and application(s) 128. The modules can represent pieces of code executing on a computing device (e.g., device 102). In some examples, individual modules can include an interface, such as an Application Program Interface (API), to perform some or all of its functionality (e.g., operations). In additional and/or alternative examples, the components can be implemented as computer-readable instructions, various data structures, and so forth via at least one processing unit (e.g., processor(s) 104) to configure the device 102 to execute instructions and to enable altering of properties of rendered objects utilizing control points associated with the rendered objects that are presented via a device 102. Functionality to perform these operations can be included in multiple devices or a single device. Additional details associated with the computer-readable media 106 are provided below with reference to FIG. 13.

As described above, the device 102 can include the input interface(s) 108 and output interface(s) 110. The input interface(s) 108 can enable input via a keyboard, keypad, mouse, microphone, touch sensor, touch screen, joystick, control buttons, scrolling buttons, cameras, sensors, or any other device suitable to generate a signal and/or data defining a user interaction with the device 102. In at least one example, cameras can capture color images and/or depth images. In at least one example, sensors can generate tracking data, position data, etc. based on motion or orientation information. Additional details associated with the input interface(s) 108 are provided below with reference to FIG. 15.

The output interface(s) 110 can enable the device to present data via a display (e.g., touch screen, liquid crystal display (LCD), etc.), speakers, haptic interfaces, or the like. In at least one example, an output interface 110 can be a hardware display surface that can be configured to provide a real-world view of an object through the hardware display surface while also providing a rendered display of an object (i.e., a rendered object). The hardware display surface can include one or more components, such as a projector, screen, or other suitable components for producing a display of an object and/or data. In some configurations, the hardware display surface can be configured to cover at least one eye of a user 112. In one illustrative example, the hardware display surface can include a screen configured to cover both eyes of a user 112. The hardware display surface can render or cause the display of one or more images for generating a view or a stereoscopic image of one or more objects. As will be described in more detail below, some configurations enable a device 102 to graphically associate holographic user interfaces and other graphical elements with an object seen through the hardware display surface or rendered objects displayed on the hardware display surface.

The hardware display surface can be configured to allow a user 112 to view objects from different environments. In some configurations, the hardware display surface can display a rendering of an object, such as rendered object 134. As described above, one or more control points 136A, 136B, 136C, can be associated with the rendered object 134. In addition, some configurations of the hardware display surface can allow a user 112 to see through selectable sections of the hardware display surface having a controllable level of transparency, enabling the user 112 to view objects in his or her surrounding environment. For illustrative purposes, a user's perspective looking at objects through the hardware display surface is referred to herein as a real-world view of an object or a real-world view of a physical object. As will be described in more detail below, computer generated renderings of objects and/or data can be displayed in, around, or near the selected portions of the hardware display surface enabling a user to view the computer generated renderings along with real-world views of objects observed through the selected portions of the hardware display surface.

Some configurations described herein provide both a see through display and an augmented reality display. For illustrative purposes, the see through display can include a transparent lens that can have content displayed on it. The augmented reality display can include an opaque display that is configured to display content over a rendering of an image, which can be from any source, such as a video feed from a camera used to capture images of an environment. For illustrative purposes, some examples described herein describe a display of rendered content over a display of an image. In addition, some examples described herein describe techniques that display rendered content over a see through display enabling a user to see a real-world view of an object with the content. It can be appreciated that the examples of the techniques described herein can apply to a see through display an augmented reality display, or variations and combinations thereof. For illustrative purposes, devices configured to enable a see through display augmented reality display, or combinations thereof are referred to herein as devices that are capable of providing a mixed environment display and/or a mixed reality environment.

Additional details associated with the hardware display surface are described below with reference to FIGS. 9A-9C, 10A-10F, and 11A-11F. Additional details associated with additional and/or alternative output interface(s) 110 are provided below with reference to FIG. 15.

As described above, the computer-readable media 106 of the device 102 can include components that facilitate interaction between the user 112 and the device 102. The operating system 114 can be configured to manage hardware and services within and coupled to the device 102 for the benefit of other components and/or modules. The gesture management module 116 can detect gestures performed by or in association with the control object and/or detect releases of gestures. Additionally and/or alternatively, the gesture management module 116 can facilitate tracking a control object. In at least one example, the gesture management module 116 can terminate tracking the control object based on determining a release of a gesture. The control point management module 118 can manage control points and interactions with control points. For instance, the control point management module 118 can cause control points to appear and disappear, determine target control points, determine displacements of control points caused by movement of control objects, etc. The feedback module 120 can provide feedback to guide a control object to a control point. The property management module 122 can execute altering properties of rendered objects utilizing control points associated with the rendered objects. The data store 124 can store data that is organized so that it can be accessed, managed, and updated. In at least one example, the data store 124 can store data indicating relationships between control points and various properties. The rendering module 126 can facilitate rendering content (including objects) for presentation via an output interface 110 of the device 102.

The device 102 can include application(s) 128 that are stored in the computer-readable media 106 or otherwise accessible to the device 102. In at least one example, applications (e.g., application(s) 128) can be created by programmers to fulfill specific tasks and/or perform specific functionalities. For example, applications (e.g., application(s) 128) can provide utility, entertainment, educational, and/or productivity functionalities to users 112 of devices 102. Applications (e.g., application(s) 128) can be built into a device (e.g., telecommunication, text message, clock, camera, etc.) or can be customized (e.g., games, news, transportation schedules, online shopping, etc.). Additional details associated with application(s) 128 are described below with reference to FIG. 14.

Figure 2:
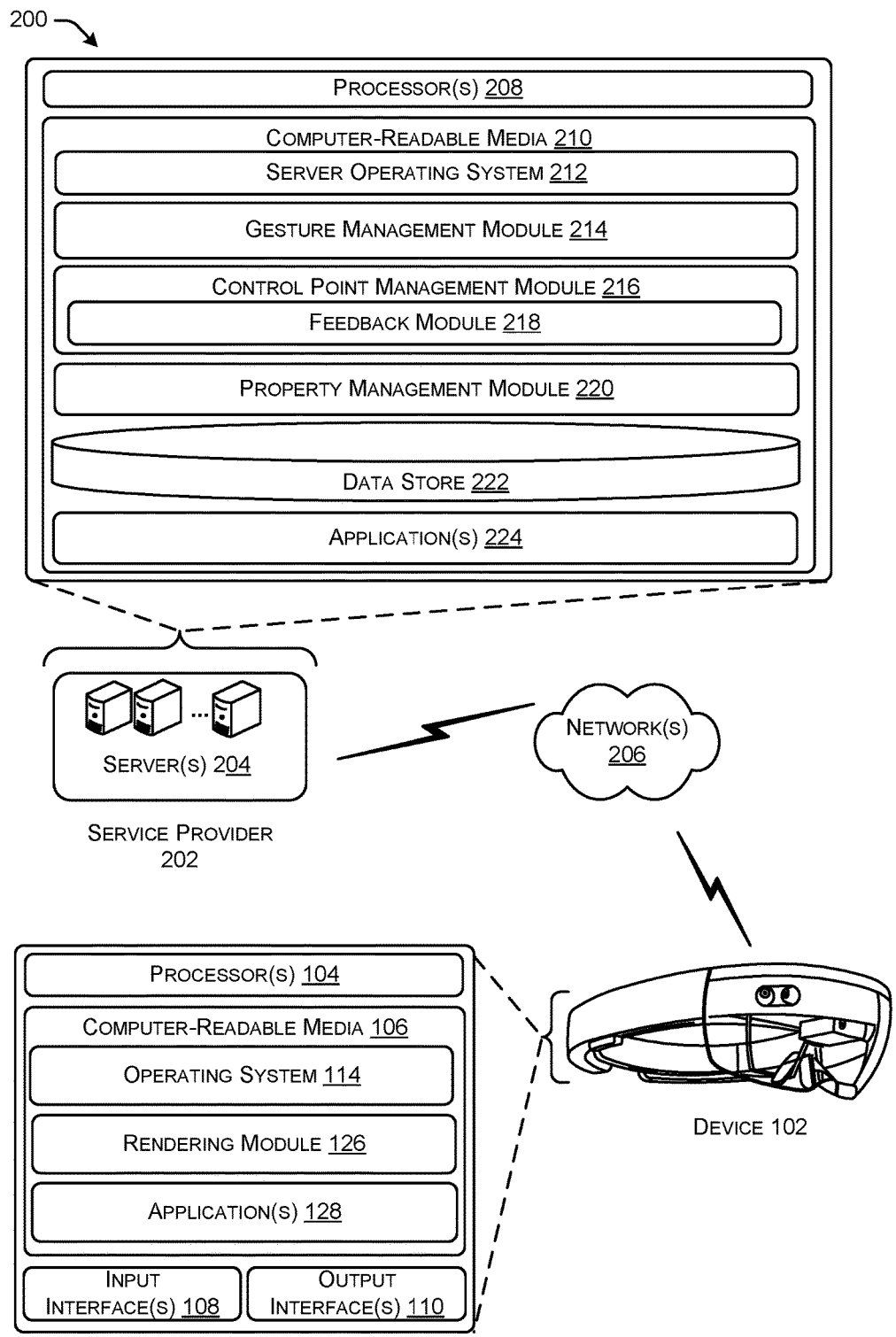
FIG. 2 is a schematic diagram showing another example environment for altering properties of rendered objects and/or mixed reality environments utilizing control points associated with the rendered objects and/or mixed reality environments.

FIG. 2 illustrates an example environment 200 for altering properties of rendered objects and/or mixed reality environments utilizing control points associated with the rendered objects and/or mixed reality environments. More particularly, the example environment 200 can include a service provider 202 including one or more servers 204 that are communicatively coupled to the device 102, for example, via one or more networks 206.

The service provider 202 can be any entity, server(s), platform, etc., that facilitates altering properties of rendered objects utilizing control points associated with the rendered objects. The service provider 202 can be implemented in a non-distributed computing environment or can be implemented in a distributed computing environment, possibly by running some modules on device 102 or other remotely located devices. In an example, the service provider 202 can be configured to receive a signal indicating a gesture has been detected. The service provider 202 can determine a target control point and can cause rendered objects that are presented via a device 102 communicatively coupled to the service provider 202 to be altered based on movement of the target control point.

As shown, the one or more servers 204 can include one or more processor(s) 208 and computer-readable media 210, such as memory. Examples support scenarios in which device(s) that can be included in the one or more servers 204 can include one or more computing devices that operate in a group or other clustered configuration to share resources, balance load, increase performance, provide fail-over support or redundancy, or for other purposes. As described above, device(s) that can be included in the one or more servers 204 can include any type of computing device having processor(s) 208 operably connected to computer-readable media 210 such as via a bus, which in some instances can include one or more of a system bus, a data bus, an address bus, a PCI bus, a Mini-PCI bus, and any variety of local, peripheral, and/or independent buses. Executable instructions stored on computer-readable media 210 can include, for example, a server operating system 212, a gesture management module 214, a control point management module 216, a feedback module 218, a property management module 220, a data store 222, application(s) 224, and other modules, programs, or applications that are loadable and executable by the processor(s) 208. In such examples, the processor(s) 208 can have a same composition and functionality as processor(s) 104 and the computer-readable media 210 can have a same composition and functionality as computer-readable media 106, described above. The server operating system 312 can be configured to manage hardware and services within and coupled to the server(s) 204 for the benefit of other components and/or modules described herein. The gesture management module 214, the control point management module 216, the feedback module 218, the property management module 220, and the data store 222 can each have a same composition and functionality, respectively, as the gesture management module 116, the control point management module 118, the feedback module 120, the property management module 122, and the data store 124, described herein. The application(s) 224 can be the same application(s) and/or different applications(s) as application(s) 128.

Alternatively, or in addition, the functionality described herein can be performed, at least in part, by one or more hardware logic components such as accelerators. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. The one or more servers 204, which can be associated with different service providers 202, can also include components, such as the components shown in FIG. 15, for executing one or more aspects of the techniques described herein.

While FIG. 2 illustrates that the gesture management module 214, the control point management module 216, the feedback module 218, the property management module 220, and the data store 222 can be located remotely from the device 102, any of the components can be located remotely from the device 102 and can be communicatively coupled to the device 102 via one or more networks 206.

The network(s) 206 can facilitate communication between the service provider 202 and the device 102. In some examples, the network(s) 206 can be any type of network known in the art, such as the Internet. Moreover, device 102 and/or service provider 202 can communicatively couple to the network(s) 206 in any manner, such as by a global or local wired or wireless connection (e.g., local area network (LAN), intranet, etc.). In addition, device 102 and/or service provider 202 can communicate using any other technology such as BLUETOOTH, WI-FI, WI-FI DIRECT, NFC, or any other suitable light-based, wired, or wireless technology. It should be appreciated that many more types of connections can be utilized than are illustrated in FIG. 2. Additional details associated with the network(s) 206 are described below with reference to FIGS. 13-15.

Turning to FIGS. 3-6, the processes described below with reference to FIGS. 3-6 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
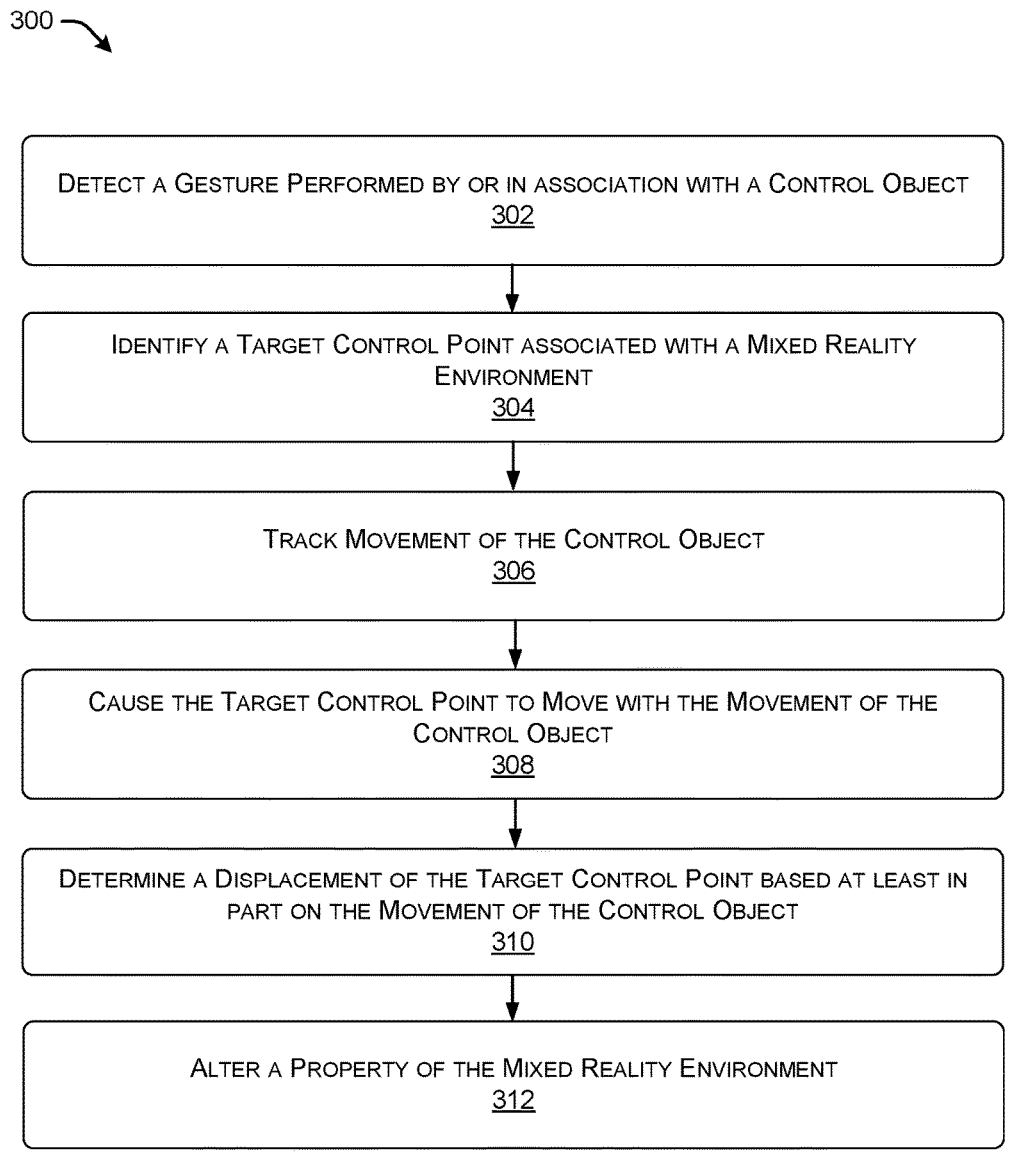
FIG. 3 is a flow diagram that illustrates an example process to alter properties of mixed reality environments utilizing control points associated with the mixed reality environments.

FIG. 3 illustrates an example process 300 to alter properties of mixed reality environments utilizing control points associated with the mixed reality environments.

Block 302 illustrates detecting a gesture performed by or in association with a control object. As described above, a control object can be a body part (e.g., finger, hand, etc.) or an extension of a body part (e.g., a stylus, tweezers, etc.). In some examples, the control object can be a rendered object. In other examples, the control object can be a real object.

In at least one example, detecting the gesture performed by or in association with the control object can be based in part on tracking data associated with a control object. Tracking data can be generated by the use of input interface(s) 108. In at least one example, the input interface(s) 108 can access structure data that can help recognize control objects to be tracked for generating tracking data. For instance, in such examples, structure data can include structural information about a skeletal model of a human to help recognize body parts (e.g., hands, fingers, etc.) or inanimate objects (e.g., stylus, tweezers, etc.). The tracking data can include motion information and/or orientation information associated with the control object. The motion information can include velocity and/or acceleration associated with the control object. The orientation can include positional information in a coordinate system or frame of reference and/or Euler angles, which can provide rotational information around a coordinate system or frame of reference. Additionally and/or alternatively, the tracking data can include depth information associated with the control object and/or surrounding environment. Additional details associated with input device(s) 108 are described below with reference to FIG. 15.

In at least one example, a processor of the processor(s) 104 can include one or more machine learning technologies for detecting a gesture performed by or in association with a control object. The term machine learning can refer to one or more programs that learns from the data it receives. For example, a machine learning mechanism can build, modify, or otherwise utilize a data model that is created from example inputs and makes predictions or decisions using the data model. In the current example, the machine learning mechanism can be used to detect a state of a control object based at least in part on tracking data. In at least one example, the machine learning mechanism can be used to detect that a hand of a user 112 is in an open state (e.g., an open palm), a closed state (e.g., a fist), a raised finger state, a compressed state, a pinch state, etc. In some examples, the machine learning mechanism can be used to detect which fingers are in a pinch state. The data model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In such examples, the processor can detect a gesture and send a signal indicating the state to the gesture management module 116. The gesture management module 116 can receive the signal and detect the gesture based at least in part on the data associated with the signal.

Additionally and/or alternatively, the gesture management module 116 can detect a gesture. In some examples, the gesture management module 116 can leverage machine learning mechanisms, as described above. In other examples, the gesture management module 116 can utilize captures of gestures (i.e., captured from an input device 108 such as a camera) and can compare a capture of a gesture to a library of gestures stored in a database or other repository, such as the data store 122. In such examples, the gesture management module 116 can identify one or more gestures in the library of gestures that are stored in the database or other repository that are most similar to the capture of the gesture and can select a gesture of the one or more gestures for detecting the gesture. In some examples, the gesture management module 116 can rank or otherwise prioritize the one or more gestures to determine a most similar gesture. In such examples, a highest ranking gesture can be the detected gesture.

In at least one example, the gesture management module 116 can leverage one or more heuristics to detect gestures. For instance, the gesture management module 116 can access and/or receive tracking data associated with an index finger and a thumb of a user 112. The gesture management module 116 can determine that the index finger and the thumb of the user 112 move within a threshold distance of one another and can determine a gesture (e.g., a pinch gesture) based at least in part on determining that the index finger and the thumb of the user 112 move within a threshold distance of one another. Additionally and/or alternatively, the gesture management module 116 can determine that the index finger and the thumb are each within a threshold distance of the bounds of a control point and can determine a gesture based at least in part on determining that the index finger and the thumb of the user 112 move within a threshold distance of the bounds of the control point.

In additional and/or alternative examples, the gesture management module 116 can receive tracking data associated with individual fingers of a user 112 (or another control object). The gesture management module 116 can determine that a finger of a user 112 (or another control object) moves within a threshold distance of a control point and/or rendered object. In some examples, one or more fingers can be in a raised state (e.g., a pointing gesture). In other examples, one or more fingers can be in an alternative configuration. Based at least in part on the one or more fingers (or another control object) moving within a threshold distance of a control point and/or rendered object, the gesture management module 116 can detect a gesture. In at least one example, based at least in part on detecting a gesture, a target control point, described below, can appear to stick, snap, attach, or otherwise couple to the one or more fingers (or another control object).

Block 304 illustrates identifying a target control point associated with a mixed reality environment. As described above, a control point can be a vertex, an edge, a control (e.g., a button, a slider, etc.), etc. In at least one example, control points can be leveraged to alter one or more properties associated with a mixed reality environment. In some examples, control points can always be visible in a mixed reality environment. In other examples, control points can generally be hidden and the control point management module 118 can present one or more control points based on a trigger.

In at least one example, a trigger can correspond to a determination that a user 112 is interacting with a particular rendered object and/or region of the mixed reality environment. In such examples, the control point management module 118 can determine that a user 112 is interacting with a particular rendered object and/or region of the mixed reality environment based on data received via an input interface 108. For instance, the control point management module 118 can determine that a user 112 is interacting with a particular rendered object and/or region of the mixed reality environment based on a control object being positioned on or proximate to the particular rendered object and/or positioned in the region of the mixed reality environment. Additionally and/or alternatively, a trigger can correspond to spoken input. In at least one example, the control point management module 118 can receive spoken input via an input interface 108. For instance, the user 112 can say "show me the control points associated with the house" or "show me the control points for this mixed reality environment."

Furthermore, a trigger can correspond to detection of a gaze target. In such examples, the control point management module 118 can determine that a particular rendered object or region of the mixed reality environment is a gaze target of a user 112. In some examples, the control point management module 118 can receive gaze data to determine what the user 112 was interacting with at or near the time the gesture was detected. In at least one example, the input interface(s) 108 can enable the generation of gaze data identifying what a user 112 is looking at, which is also referred to herein as a gaze target. In some configurations, a gaze target can be identified by the use of input interface(s) 108 enabling the generation of gaze data identifying a direction in which a user is looking, which is also referred to herein as a gaze direction. For example, an input interface 108, such as a camera or depth map sensor, mounted to a device 102 can be directed towards a user's field of view. The control point management module 118 can analyze gaze data generated from the input interface(s) 108 to determine if a rendered object in the field of view is in a pre-determined position or area of an image of the image data. If a rendered object is positioned within a pre-determined area of at least one image, such as the center of the image, the control point management module 118 can determine that the rendered object is a gaze target. Additionally and/or alternatively, the control point management module 118 can determine a region of the mixed reality environment in which the rendered object is located and can determine that the region is a gaze target. In alternative examples, the control point management module 118 can determine gaze targets using the position of a user's 112 head, nose, etc. instead of, or in addition to, gaze.

Other types of data can be utilized to identify a gaze target and a gaze direction. For instance, a compass, positioning tracking component (e.g., a GPS component), and/or an accelerometer can be used to generate data indicating a gaze direction and data indicating the location of a particular rendered object. Using such data, the techniques described herein can determine that the particular rendered object is a gaze target. Other data, such as data indicating a speed and direction in which a rendered object is moving can also be used to identify a gaze direction and/or a gaze target.

In some configurations, input interface(s) 108 can be directed toward at least one eye of a user 112. Gaze data indicating the direction and/or position of at least one eye can be used to identify a gaze direction and a gaze target. Such configurations can be used when a user 112 is looking at a rendering of an object displayed on a hardware display surface. In one illustrative example, if a head mounted display device (e.g., device 102) worn by a user 112 has two distinct objects rendered on the hardware display surface, the input interface(s) 108 directed toward at least one eye of a user 112 can enable the generation of gaze data indicating if the user is looking at the first rendered object or the second rendered object. Additional details of a configuration having input interface(s) 108 directed toward at least one eye of a user 112 are provided below in reference to FIGS. 9A-9C, 10A-10F, and 11A-11F. Such configurations can be used with other techniques described herein to enable a device 102 to identify a gaze target.

Based at least in part on detecting a gesture performed by or in association with a control object, the control point management module 118 can determine a target control point. In at least one example, the control point management module 118 can determine distances between the control object and one or more control points associated with a mixed reality environment. In such examples, the control point management module 118 can calculate a distance between a point in a coordinate system that corresponds to the control object and each point in the coordinate system that corresponds to a control point. In at least one example, the control point management module 118 can perform triangulation calculations or any other calculation to determine the distances between the control object and one or more control points associated with a mixed reality environment. In some examples, the control point management module 118 can conserve computational resources by filtering out any control points that are outside of a threshold distance away from the control object. That is, in some examples, the control point management module 118 can limit distance calculations to calculations of distances between a control object and one or more control points that are within a threshold distance of the control object. In at least one example, a control point that is the shortest distance away from the control object can be determined to be the target control point.

In additional and/or alternative examples, the control point management module 118 can determine a target control point based on determining that a particular control point is a gaze target, as described above, and/or based on contextual data. For illustrative purposes, contextual data can be data that indicates how a user 112 is interacting with the mixed reality environment at the time of and/or was interacting with the mixed reality environment immediately prior to the detection of the gesture performed by or in association with the control object. Contextual data can identify a gaze target indicating where a user 112 was looking at the time of and/or immediately prior to the detection of the gesture performed by or in association with the control object. Additionally and/or alternatively, contextual data can identify a state of an application 128 that the user 112 was interacting with at the time of and/or immediately prior to the detection of the gesture performed by or in association with the control object. Furthermore, contextual data can identify other gestures performed by or in association with the control object at the time of and/or immediately prior to the detection of the gesture performed by or in association with the control object. Moreover, contextual data can leverage voice commands to determine how the user 112 is interacting with the mixed reality environment at the time of and/or immediately prior to the detection of the gesture performed by or in association with the control object.

Block 306 illustrates tracking movement of the control object. Based at least in part on determining a target control point, at least one input interface 108 can begin to, or continue to, track movement of the control object. That is, as a user 112 manipulates the control object through the mixed reality environment, input interface(s) 108 can generate tracking data and provide the tracking data to one or more modules, such as the control point management module 118, in near real-time. As described above, movement of the control object can refer to movement along an x-axis, movement along a y-axis, movement along a z-axis, rotation around the x-axis, rotation around the y-axis, rotation around the z-axis, combinations of the foregoing, etc.

Block 308 illustrates causing the target control point to move with the movement of the control object. The control point management module 118 can leverage the tracking data to cause the target control point to move with the movement of the control object. The target control point can track the movement of the control object until a release gesture is detected. Additional description about detecting a release gesture is described below with reference to FIG. 5.

Block 310 illustrates determining a displacement of the target control point based at least in part on the movement of the control object. In at least one example, the control point management module 118 can leverage the tracking data to determine position data associated with the target control point. In such examples, the control point management module 118 can determine a position of the target control point after tracking the movement of the control object. That is, the control point management module 118 can determine the position of the target control point relative to the original position of the target control point. The control point management module 118 can determine a displacement of the target control point based on the position data. The displacement can have one or more measurements. For instance, the displacement can include measurements associated with displacement along an x-axis, displacement along a y-axis, displacement along a z-axis, displacement around the x-axis, displacement around the y-axis, displacement around the z-axis, combinations of the foregoing, etc. In at least one example, the control point management module 118 can send data indicating the displacement (i.e., displacement data) to the property management module 122.

Block 312 illustrates altering a property of the mixed reality environment. In at least one example, the property management module 122 can leverage the displacement data to alter at least one property associated with a mixed reality environment. In some examples, each control point can be mapped to, or otherwise associated with, one or more properties. The data store 124 can store relationships between the control points and one or more properties. Examples of properties that can be altered include, but are not limited to, a scale of a mixed reality environment, a rotation of a mixed reality environment (e.g., pitch, yaw, roll), a filter applied to the mixed reality environment, etc.

In at least one example, the property management module 122 can access the data store 124 to determine one or more properties that correspond with the target control point. Based at least in part on determining the one or more properties that correspond with the target control point, the property management module 122 can leverage the displacement data to alter the one or more properties associated with the mixed reality environment. In at least one example, the property management module 122 can alter the one or more properties associated with the mixed reality environment proportional to the displacement.

In at least one example, the techniques described herein can modify a rendering of the mixed reality environment to reflect changes to the mixed reality environment caused by altering the one or more properties.

Figure 4:
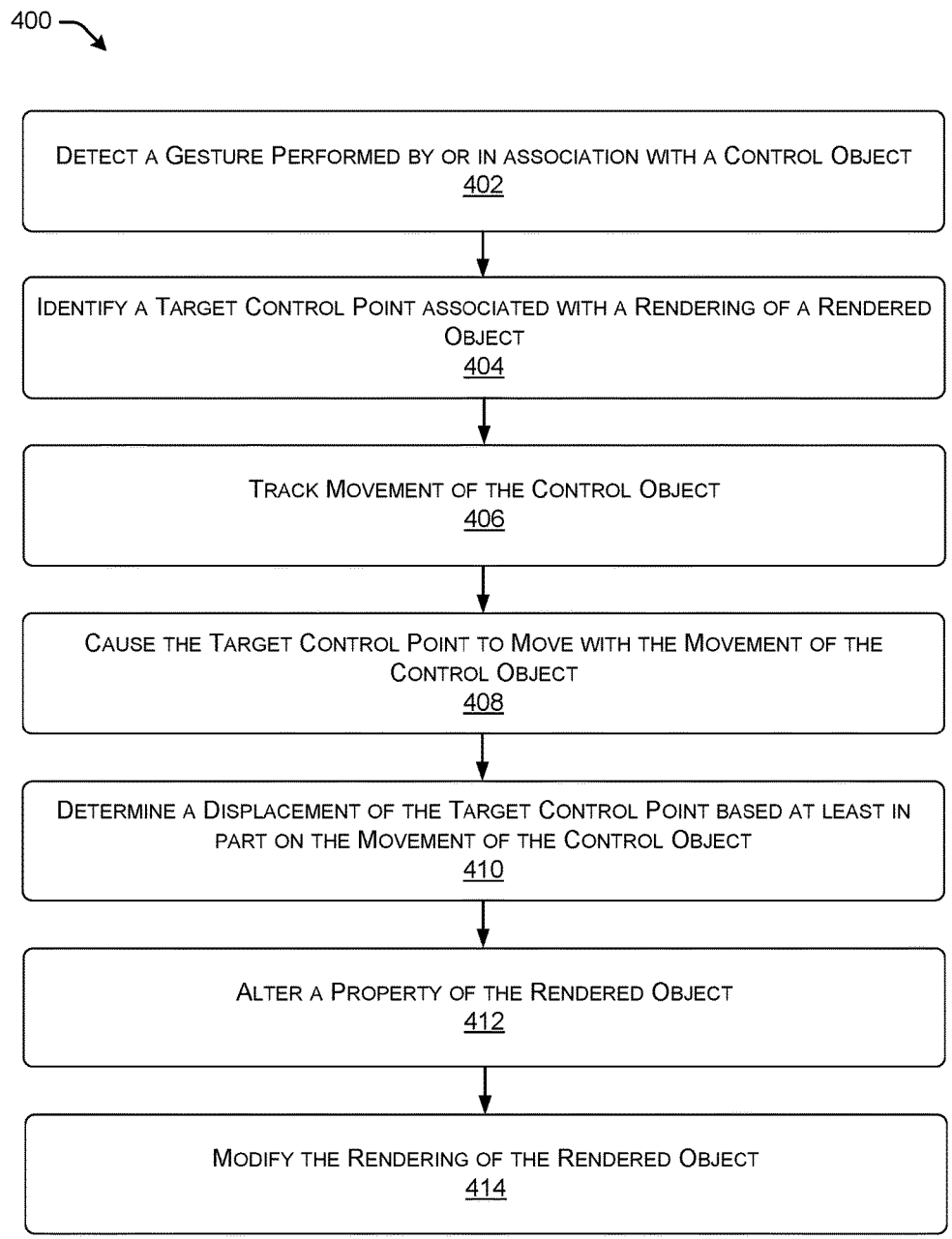
FIG. 4 is a flow diagram that illustrates an example process to alter properties of rendered objects utilizing control points associated with the rendered objects.

FIG. 4 illustrates an example process 400 to alter properties of rendered objects utilizing control points associated with the rendered objects.

Block 402 illustrates detecting a gesture performed by or in association with a control object. The gesture management module 116 can detect a gesture that is performed by or in association with the control object, as described above with reference to block 302.

Block 404 illustrates identifying a target control point associated with a rendering of a rendered object. As described above, a control point can be a vertex, an edge, a control (e.g., a button, a slider, etc.), etc. In at least one example, control points can be leveraged to alter one or more properties associated with a rendered object. As described above, in some examples, control points can always be visible. In other examples, control points can generally be hidden and the control point management module 118 can present one or more control points based on a trigger, as described above. The control point management module 118 can identify a target control point, as described above with reference to block 304.

Block 406 illustrates tracking movement of the control object. Based at least in part on determining a target control point, at least one input interface 108 can begin to, or continue to, track movement of the control object. That is, as a user 112 manipulates the control object through the mixed reality environment, input interface(s) 108 can generate tracking data and provide the tracking data to one or more modules, such as the control point management module 118, in near real-time. As described above, movement of the control object can refer to movement along an x-axis, movement along a y-axis, movement along a z-axis, rotation around the x-axis, rotation around the y-axis, rotation around the z-axis, combinations of the foregoing, etc.

Block 408 illustrates causing the target control point to move with the movement of the control object. The control point management module 118 can leverage the tracking data to cause the target control point to move with the movement of the control object. In some examples, a vertex or edge corresponding to the target control point can move with the movement of the control object and other vertices or edges associated with the rendered object can persist in the same position. For instance, if the property associated with the target control point is a deformation property, the vertex or edge corresponding to the target control point can move with the movement of the control object and other vertices or edges associated with the rendered object may persist in the same position. In other examples, all of the vertices or edges associated with a rendered object can move with the movement of the target control point. For instance, if the property associated with the target control point is scale, movement, rotation, etc., all of the vertices or edges can move with the movement of the target control point. The target control point can track the movement of the control object until a release gesture is detected. Additional description about detecting a release gesture is described below with reference to FIG. 5.

Block 410 illustrates determining a displacement of the target control point based at least in part on the movement of the control object. In at least one example, the control point management module 118 can leverage the tracking data to determine position data associated with the target control point. In such examples, the control point management module 118 can determine a position of the target control point after tracking the movement of the control object. That is, the control point management module 118 can determine the position of the target control point relative to the original position of the target control point. The control point management module 118 can determine a displacement of the target control point based on the position data. The displacement can have one or more measurements. For instance, the displacement can include measurements associated with displacement along an x-axis, displacement along a y-axis, displacement along a z-axis, displacement around the x-axis, displacement around the y-axis, displacement around the z-axis, combinations of the foregoing, etc. In at least one example, the control point management module 118 can send data indicating the displacement (i.e., displacement data) to the property management module 122.

Block 412 illustrates altering a property of the rendered object. In at least one example, the property management module 122 can leverage the displacement data to alter at least one property associated with the rendered object. Each control point can be mapped to, or otherwise associated with, one or more properties. The data store 124 can store relationships between the control points and one or more properties. Examples of properties that can be altered include, but are not limited to, a scale of a rendered object, a 3D structure of a rendered object, a position of a rendered object (e.g., x, y, z coordinates), a rotation of a rendered object (e.g., pitch, yaw, roll), etc.

In at least one example, the property management module 122 can access the data store 124 to determine one or more properties that correspond with the target control point. Based at least in part on determining the one or more properties that correspond with the target control point, the property management module 122 can leverage the displacement data to alter the one or more properties associated with the mixed reality environment. In at least one example, the property management module 122 can alter the one or more properties associated with the mixed reality environment proportional to the displacement.

Block 414 illustrates modifying the rendering of the rendered object. In at least one example, the rendering module 126 can modify a rendering of the rendered object to reflect changes to the object caused by altering the property.

For instance, in an example where the property is a 3D structure of the object, the rendering module 126 can access and/or receive position data corresponding to each control point associated with a rendered object and can modify the rendering of the rendered object so that the vertices of the rendered object match the position of each control point. Then, the rendering module 126 can utilize rendering logic to render the rendered object on a hardware display surface, for instance. As a non-limiting example, the rendered object be a cube. In such an example, each vertex of the cube can be associated with a control point. The control object can interact with a target control point such to move the target control point, and corresponding vertex, to a new position. In such an example, other control points, and corresponding vertices, associated with the rendered object can persist in a same position, causing the cube to deform to a trapezoidal prism. The rendering module 126 can modify the rendering of the rendered object from a cube to a trapezoidal prism based on the new position of the target control point and corresponding vertex.

As another example where the property is a scale of the rendered object, the rendering module 126 can access and/or receive displacement data corresponding to each control point associated with a rendered object and can determine a scale factor associated with the target control point. The rendering module 126 can subsequently modify the rendering of the rendered object so that other vertices associated with the rendered object are affected by a same scale factor. Then, the rendering module 126 can utilize rendering logic to render the rendered object on a hardware display surface, for instance. As a non-limiting example, a rendered object can be a cube. In such an example, each vertex of the cube can be associated with a control point. The control object can interact with a target control point such to move the target control point, and corresponding vertex, to a new position. In such an example, other control points, and corresponding vertices, associated with the rendered object can be caused to move to new positions in near real time. The new positions of each of the other control points can be determined by the displacement of the target control point. For instance, if the displacement of the target control point corresponds to an increase in scale by a scale factor of two, the new positions of other control points can correspond to an increase in scale by a scale factor of two. The rendering module 126 can modify the rendering of the rendered object from a cube to a cube increased in scale by a scale factor of two, based on the new position of the control points and corresponding vertices.

Figure 5:
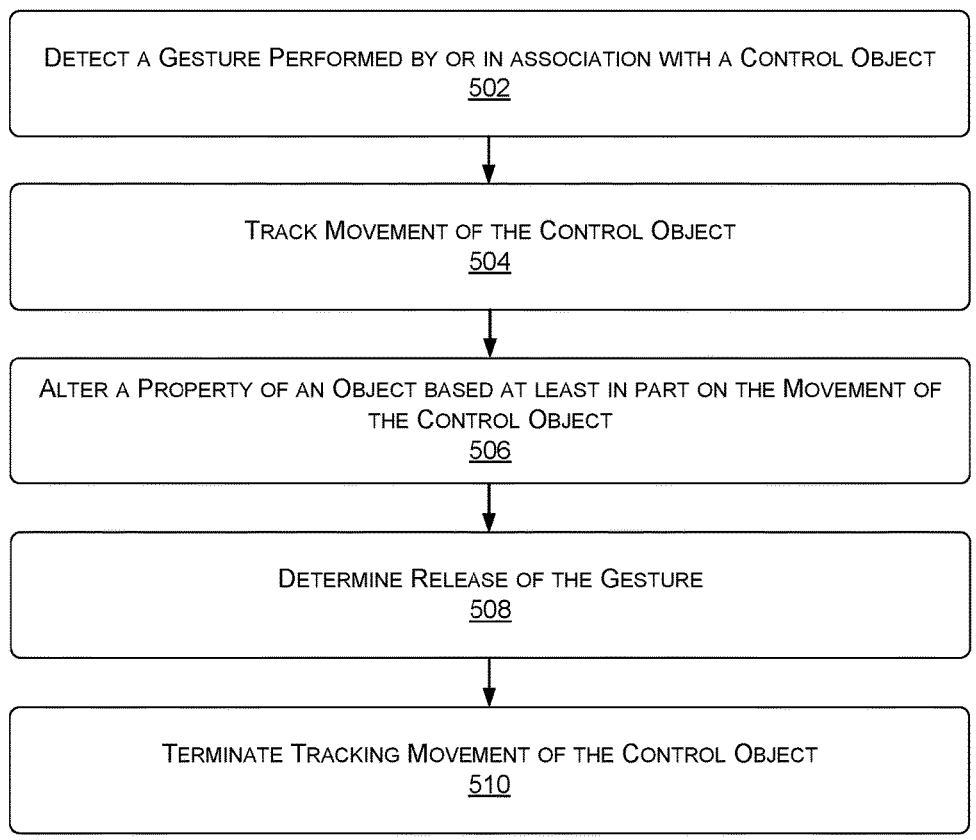
FIG. 5 is a flow diagram that illustrates an example process to terminate tracking movement of the control object based on a release of a gesture.

FIG. 5 illustrates an example process 500 to terminate tracking movement of the control object based on a release of a gesture.

Block 502 illustrates detecting a gesture performed by or in association with a control object. The gesture management module 116 can detect a gesture that is performed by or in association with the control object, as described above with reference to block 302.

Block 504 illustrates tracking movement of the control object. Based at least in part on determining a target control point, at least one input interface 108 can begin to, or continue to, track movement of the control object. That is, as a user 112 manipulates the control object through the mixed reality environment, input interface(s) 108 can generate tracking data and provide the tracking data to one or more modules, such as the control point management module 118, in near real-time. As described above, movement of the control object can refer to movement along an x-axis, movement along a y-axis, movement along a z-axis, rotation around the x-axis, rotation around the y-axis, rotation around the z-axis, combinations of the foregoing, etc.

Block 506 illustrates altering a property of the object. In at least one example, the property management module 122 can alter a property associated with a rendered object and/or mixed reality environment based on the movement of the target control point. Examples of properties that can be altered are described above.

Block 508 illustrates determining a release of the gesture. The gesture management module 116 can determine when the gesture is released.

As described above, in at least one example, a processor of the processor(s) 104 can include one or more machine learning technologies for detecting a gesture performed by or in association with a control object. In at least one example, the machine learning mechanism can be used to detect that a hand of a user 112 is in an open state (e.g., an open palm), a closed state (e.g., a fist), a raised finger state, a compressed state, a pinch state, etc. As described above, the processor can leverage tracking data to detect a state and send a signal indicating the state to the gesture management module 116. In at least one example, the gesture management module 116 can receive the signal and, based at least in part on the state being any state other than the pinch state, the gesture management module 116 can determine a release of the gesture.

Additionally and/or alternatively, the gesture management module 116 can detect a release of a gesture. In some examples, the gesture management module 116 can leverage machine learning mechanisms, as described above. In other examples, the gesture management module 116 can utilize captures of gestures (i.e., captured from an input device 108 such as a camera) and can compare a capture of the gesture to a library of gestures stored in a database or other repository, such as the data store 122, for example. In such examples, the gesture management module 116 can identify one or more gestures in the library of gestures that are stored in the database or other repository that are most similar to the capture of the gesture and can select a gesture of the one or more gestures in detecting the gesture. In some examples, the gesture management module 116 can rank or otherwise prioritize the one or more gestures to determine a most similar gesture. In at least one example, based at least in part on the top ranking gesture being any state other than a pinch gesture, the gesture management module 116 can determine a release of the gesture.

In some examples, the gesture management module 116 can leverage heuristics to determine a release of the gesture. In at least one example, the gesture management module 116 can utilize tracking data associated with an index finger and a thumb of a user 112. The gesture management module 116 can determine that the index finger and the thumb of the user 112 move outside of a threshold distance of one another and can determine a release of the gesture (e.g., a pinch gesture) based at least in part on determining that the index finger and the thumb of the user 112 move outside of a threshold distance of one another. Additionally and/or alternatively, the gesture management module 116 can determine that the index finger and the thumb each move outside of a threshold distance of the bounds of a control point and can determine a release of the gesture based at least in part on determining that the index finger and the thumb of the user 112 move outside of a threshold distance of the bounds of the control point.

Moreover, the gesture management module 116 can leverage tracking data to determine a speed of the control object. In at least one example, based at least in part on determining that the speed of the control object meets or exceeds a threshold, the gesture management module 116 can determine a release. Additionally and/or alternatively, the gesture management module 116 can leverage tracking data to determine a rotation of the control object. In at least one example, based at least in part on determining that the rotation of the control object meets or exceeds a threshold, the gesture management module 116 can determine a release. In at least one example, the gesture management module 116 can leverage tracking data to determine a position of the control object. In at least one example, based at least in part on determining that the position of the control object passes outside of a predetermined boundary, the gesture management module 116 can determine a release. For instance, in some examples, the predetermined boundary can be a boundary of a control (e.g., a slider), a field of view (e.g., gesture field of view, visual field of view, etc.), etc.

Additionally and/or alternatively, the gesture management module 116 can determine a release based at least in part on receiving spoken input via an input interface 108. For instance, a user 112 can say "release the gesture" or "stop tracking" and the gesture management module 116 can leverage the spoken input to determine a release of the gesture. Furthermore, in some examples, the gesture management module 116 can determine a release based at least in part on a detected presence of another control object.

Block 510 illustrates terminating tracking movement of the control object. The gesture management module 116 can terminate any tracking of the control object. In at least one example, based at least in part on terminating any tracking the target control point can appear to release, detach, unstick, or otherwise uncouple from the control object.

Figure 6:
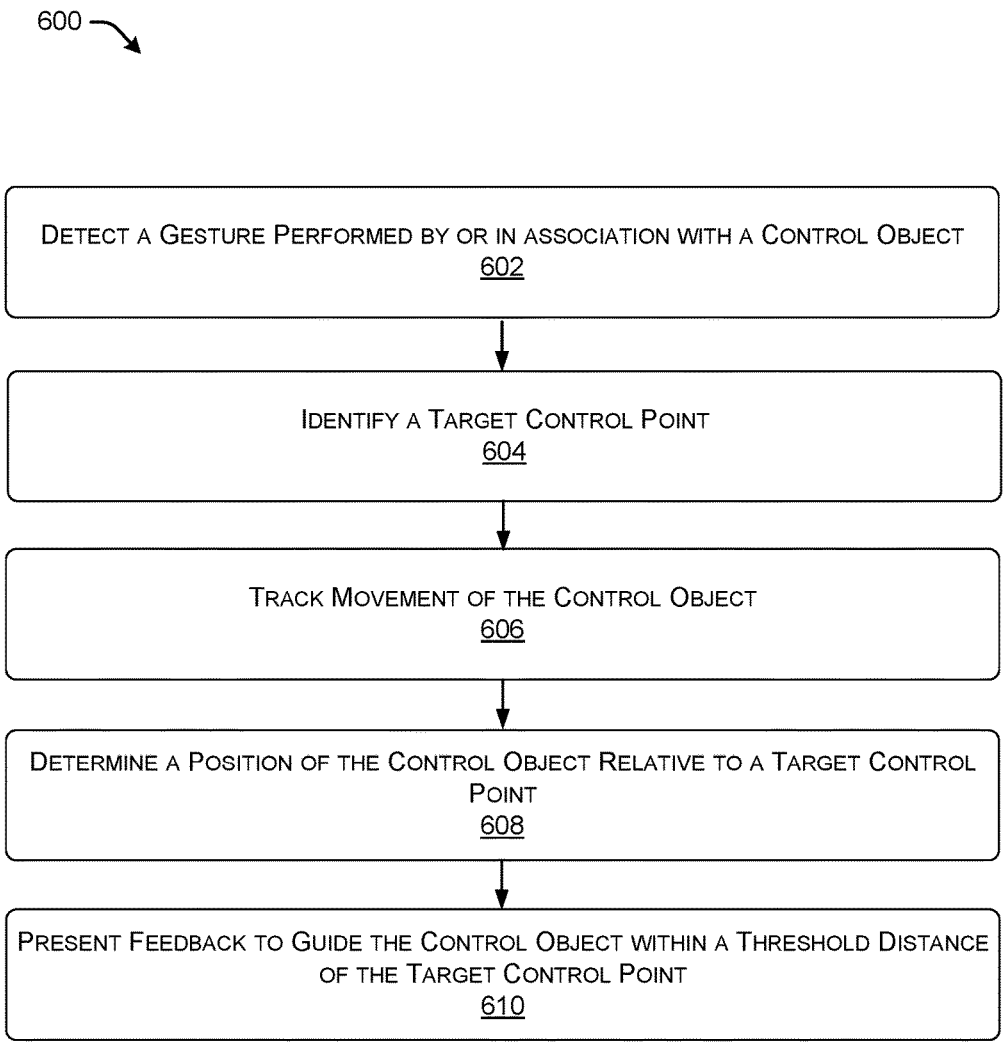
FIG. 6 is a flow diagram that illustrates an example process to present feedback to enable altering properties of rendered objects utilizing control points associated with the rendered objects.

FIG. 6 illustrates an example process 600 to present feedback to enable altering properties of rendered objects utilizing control points associated with the rendered objects.

Block 602 illustrates detecting a gesture performed by or in association with a control object. The gesture management module 116 can detect a gesture that is performed by or in association with the control object, as described above with reference to block 302.

Block 604 illustrates identifying a target control point associated with a rendering of a rendered object. The control point management module 118 can identify a target control point, as described above with reference to block 304.

Block 606 illustrates tracking movement of the control object. Based at least in part on determining a target control point, at least one input interface 108 can begin to, or continue to, track movement of the control object. That is, as a user 112 manipulates the control object through the mixed reality environment, input interface(s) 108 can generate tracking data and provide the tracking data to one or more modules, such as the gesture management module 116, in near real-time. As described above, movement of the control object can refer to movement along an x-axis, movement along a y-axis, movement along a z-axis, rotation around the x-axis, rotation around the y-axis, rotation around the z-axis, combinations of the foregoing, etc.

Block 608 illustrates determining a position of the control object relative to a target control point. The feedback module 120 can access and/or receive position data associated with the control object and the target control point. Based at least in part on the position data, the feedback module 120 can determine a position of the control object relative to a target control point.

Block 610 illustrates presenting feedback to guide the control object within a threshold distance of the target control point. In at least one example, the feedback module 120 can leverage the position of the control object relative to the target control point to present feedback to a user 112. As an example, the feedback can include rendering a shadow of the control object on a rendered object, as if a light is shining behind the control object. The user 112 can use the shadow to determine whether to move the control object closer or further away from the target control point. An additional and/or alternative example can be to cause the target control point to light up or make a sound when the control object is within a threshold distance or distance range of the target control point. In some examples, the brightness of the light or the loudness of the sound can increase as the control object gets closer to the target control point, or can decrease as the control object moves further away from the target control point.

In at least one example, the feedback module 120 can cause an animation to appear to guide the control object within a threshold distance of the target control point. For instance, in at least one example, the target control point can pulse, appear, disappear, change form, etc. to provide feedback to the user 112 with respect to the proximity between the control object and the target control point. Additionally and/or alternatively, in some examples, based at least in part on detecting a gesture and determining the target control point, the feedback module 120 can cause a line or a path to be presented to enable the control object to move towards the target control point. In some examples, the feedback module 120 can cause the target control point to stick, snap, attach, or otherwise couple to the control object, or provide some other feedback to the user 112, based at least in part on detecting a gesture and determining that the control object is within a threshold distance or distance range of the target control point.

Figure 7A:
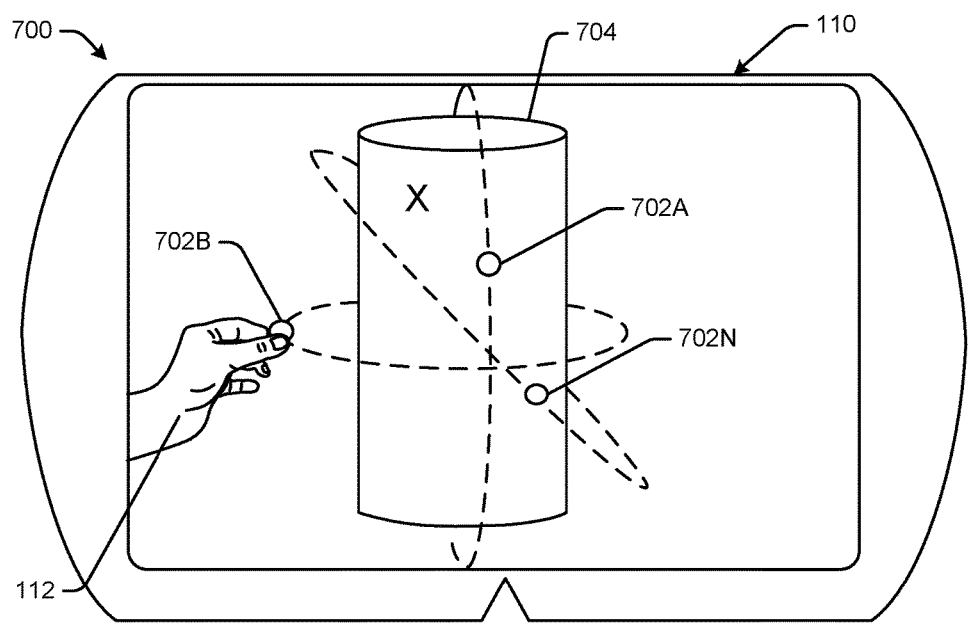
FIG. 7A is a schematic diagram of an example of a mixed reality environment including a rendered object with a plurality of control points.

FIG. 7A is an example of a mixed reality environment 700 including a plurality of control points 702A, 702B, and 702N that are associated with a rendered object 704. Rendered object 704 is marked with an "X" as a reference point. In some examples, control points (e.g., 702A, 702B, 702C) can be associated with one or more properties and/or one or more rendered objects. In other examples, control points (e.g., 702A, 702B, 702C) can be associated with arbitrary constraints limiting the movement of the control points. In a non-limiting example, control point 702A can be associated with a rotation around the x-axis, control point 702B can be associated with rotation around the y-axis, and control point 702N can be associated with rotation around the z-axis. Any number of control points can be associated with rendered object 704 and control points 702A, 702B, and 702N should not be construed as limiting. The mixed reality environment is provided via a hardware display surface, as described above. As illustrated, the hand of the user 112 is in a pinch gesture state. The hand of the user 112 is interacting with control point 702B. In such an example, control point 702B can be considered the target control point.

Figure 7B:
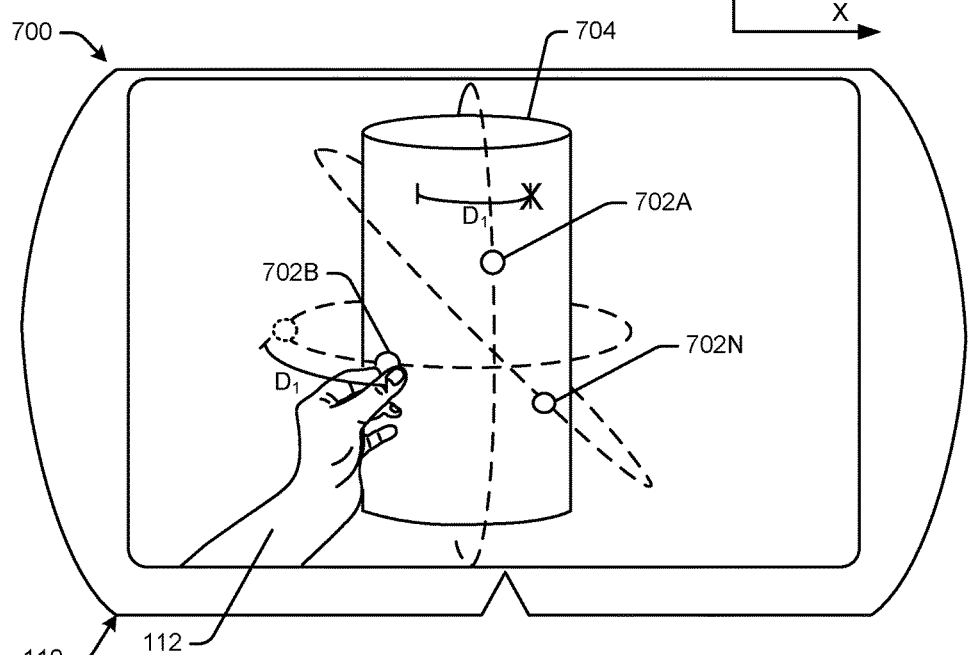
FIG. 7B is a schematic diagram of an example of a mixed reality environment including a rendered object with a plurality of control points.

FIG. 7B is an example of the mixed reality environment 700 including the plurality of control points 702A, 702B, and 702N that are associated with the rendered object 704. As illustrated in FIG. 7B, the user 112 has moved his or her hand and control point 702B has tracked with the user 112. As a result, control point 702B has rotated a distance, $D_1$, from its original position (in FIG. 7A). Accordingly, rendered object 704 is rotated around the y-axis in an amount that is proportional to the distance, $D_1$. As illustrated in FIG. 7B, the "X" on the rendered object 704 has rotated a same distance, $D_1$, around the y-axis.

Figure 8A:
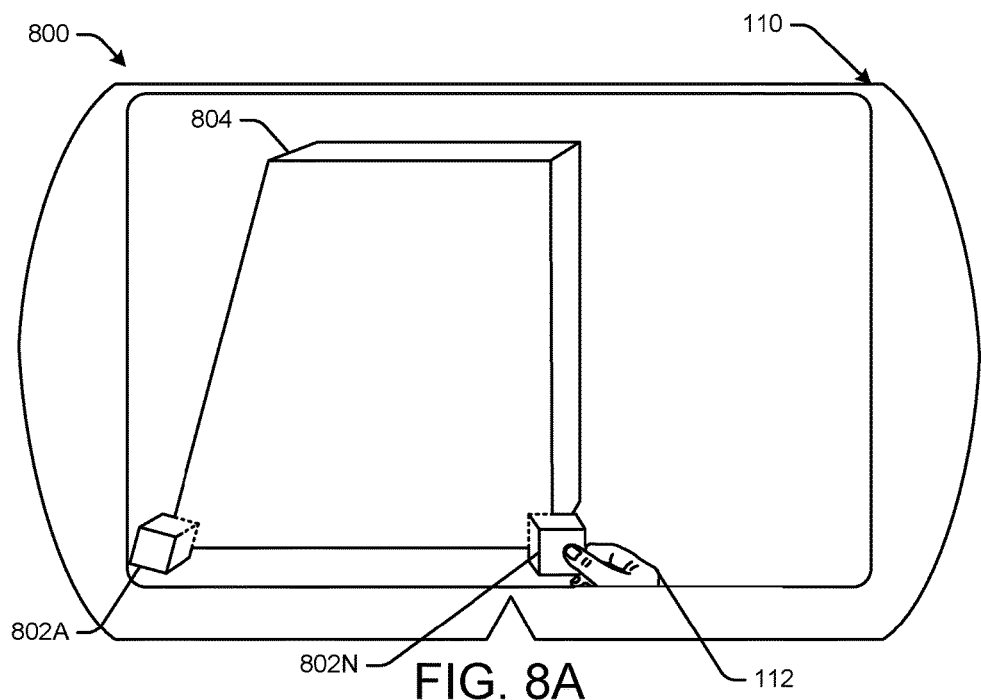
FIG. 8A is a schematic diagram of an example of a mixed reality environment including a rendered object with a plurality of control points.

FIG. 8A is an example of a mixed reality environment 800 including a plurality of control points 802A and 802N that are associated with a rendered object 804. In a non-limiting example, control point 802A can be associated with movement in a 3D coordinate space or frame of reference (e.g., along a x-axis, along a y-axis, along a z-axis, around a x-axis, around a y-axis, around a z-axis, etc.). Any number of control points can be associated with rendered object 804 and control points 802A and 802N should not be construed as limiting. The mixed reality environment is provided via a hardware display surface, as described above. As illustrated, the hand of the user 112 is in a pinch gesture state. The hand of the user 112 is interacting with control point 802N. In such an example, control point 802N can be considered the target control point.

Figure 8B:
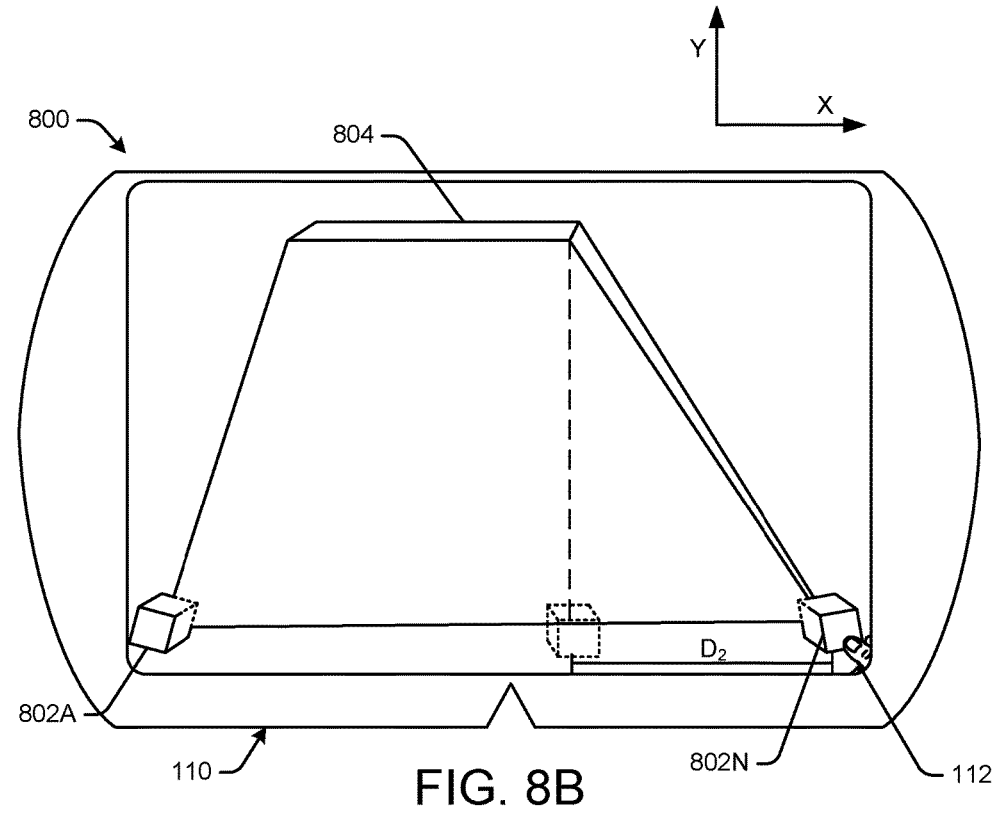
FIG. 8B is a schematic diagram of an example of a mixed reality environment including a rendered object with a plurality of control points.

FIG. 8B is an example of the mixed reality environment 800 including the plurality of control points 802A and 802N that are associated with the rendered object 804. As illustrated in FIG. 8B, the user 112 has moved his or her hand and control point 802N has tracked with the user 112. As a result, control point 802N has moved a distance, $D_2$, from its original position (in FIG. 8A) and the vertex corresponding to control point 802N has moved to the same position. However, the other control point 802A and corresponding vertex has persisted in a same position. Accordingly, rendered object 804 is deformed. The rendering module 126 can modify the rendering of rendered object 804 to reflect the new position(s) of the vertices.

Figure 9A:
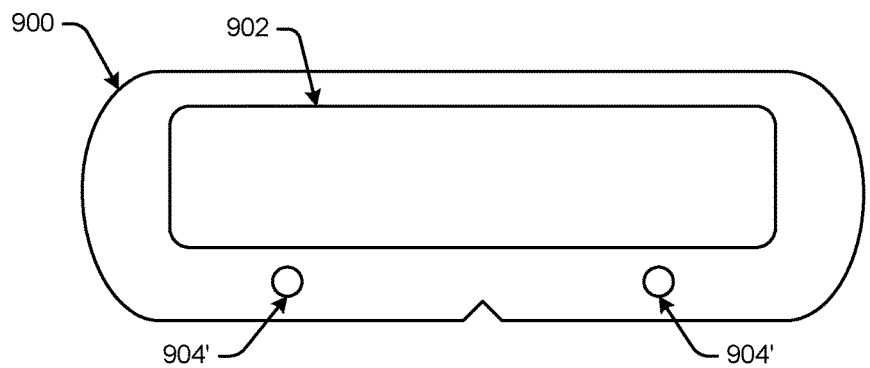
FIG. 9A is a schematic diagram showing aspects of a device having sensors for tracking the movement of at least one eye of a user.

Referring now to FIGS. 9A-9C, 10A-10F, and 11A-11F, the following section describes techniques for identifying a gaze target. As described above, techniques described herein can additionally and/or alternatively utilize head position, nose position, etc. FIG. 9A is back view of a device 900 (e.g., device 102, device 102, etc.) having a hardware display surface 902 (e.g., hardware display surface) and one or more sensors 904 (e.g., sensor(s) 108). To facilitate functionality described herein, in at least one example, sensor(s) 904' can be configured to track the position of at least one eye of a user 112. In addition, at least one other sensor 904 can be directed toward a real-world object for generating image data of the real-world object. As will be described in more detail below, examples can process eye position data, image data, and other data to identify a gaze target that is a rendered object displayed on a hardware display surface 902 or a real-world object viewed through a transparent section of the hardware display surface 902. As will also be described below, examples described herein can also determine if the user 112 is looking at a particular section of a hardware display surface 902, a particular part of a real-world object, or a particular part of a rendered object. Such information can be useful for determining the appropriate content to present based on detected user confusion, as described above.

In FIG. 9A, the device 900 comprises two sensors 904' for generating data or a signal indicating the position or movement of at least one eye of a user 112. The sensors 904' can be in the form of a camera or another suitable device for tracking the position or movement of at least one eye of a user 112. The device 102 also comprises at least one hardware display surface 902 for allowing a user 112 to view one or more objects. The hardware display surface 902 can provide a view of a real-world object through the hardware display surface 902 as well as images of rendered objects that can be displayed on the hardware display surface 902, as described above.

Figure 9B:
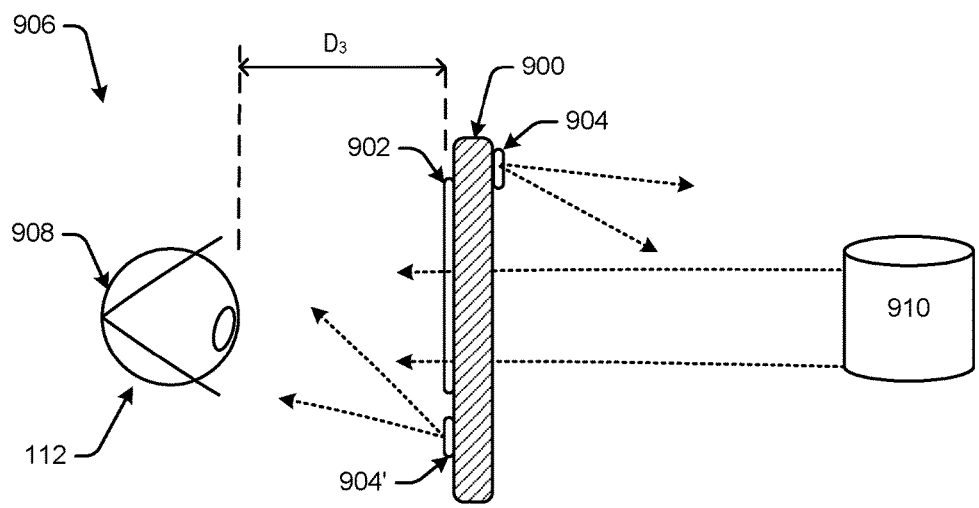
FIG. 9B is a schematic diagram showing aspects of a device having sensors for tracking the movement of at least one eye of a user.

FIG. 9B is a side cutaway view 906 of the device 900 shown in FIG. 9A. FIG. 9B includes an eye 908 of a user 112 looking through the hardware display surface 902. The hardware display surface 902 is configured to create transparent sections enabling a user 112 to view objects through the hardware display surface 902. FIG. 9B shows an example arrangement where a real-world object 910 is aligned with a transparent section of the hardware display surface 902 allowing the user 112 to view the real-world object 910 through the hardware display surface 902. The hardware display surface 902 can display one or more rendered objects. The device 102 also comprises at least one sensor 904' directed toward at least one eye 908 of the user 112.

Figure 9C:
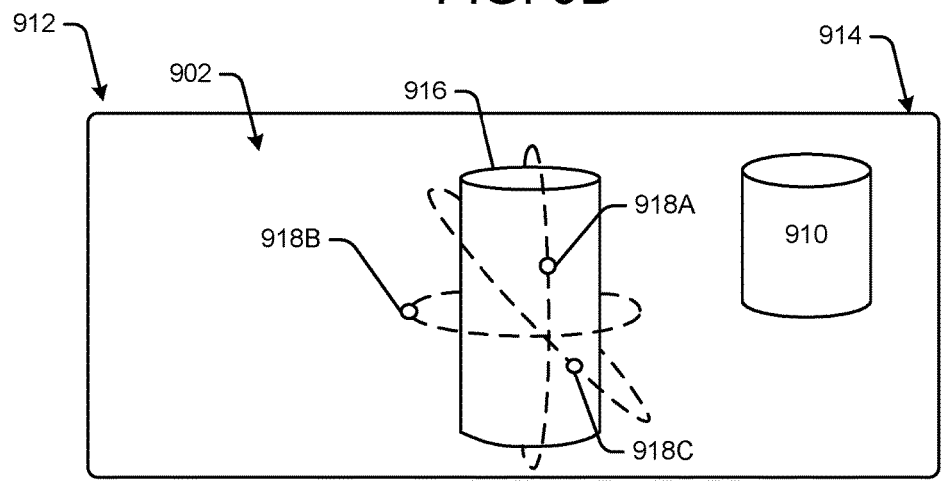
FIG. 9C is a schematic diagram showing aspects of a device having sensors for tracking the movement of at least one eye of a user.

FIG. 9C illustrates an example view 912 that can be observed by a user 112 via the hardware display surface 902. The thick double line 914 illustrates the boundary of the hardware display surface 902. In this illustrative example, the view 912 includes a rendered object 916 that is displayed on the hardware display surface 902. The rendered object 916 is associated with three control points, 918A, 918B, and 918C. The real-world object 910 is viewed through the hardware display surface 902.

To facilitate aspects of such an example, the device 102 can utilize one or more techniques for calibrating the device 102. The following section, in conjunction with FIGS. 10A-10F, describes aspects of a technique for obtaining calibration data. A subsequent section, in conjunction with FIG. 11A-FIG. 11F, describes aspects of an example scenario where a device 102 processes the calibration data and other data to identify a gaze target.

A device 900 can be calibrated in a number of ways. In one example, a device 900 can utilize the display of a number of graphical elements at predetermined locations. As the graphical elements are displayed, the device 900 can prompt the user to look at a particular graphical element and provide an input to verify that the user 112 is looking at the particular graphical element. When the user verifies that he or she is looking at the particular graphical element, sensor(s) 904' can generate eye position data defining a position of at least one eye. The eye position data can be stored in a data structure in memory in response to receiving the verification from the user 112.

FIG. 10A illustrates an example view 1000 that can be captured by the sensors 904' of the device 900. From such a perspective, the device 900 can determine one or more values that define the position of at least one eye 908 of the user 112. In one illustrative example, the values can include a second value ($D_4$) indicating a distance between a user's eyes and a third value ($D_5$), fourth value ($D_6$), and a fifth value ($D_7$) indicating a distance between at least one eye of the user 112 and a reference point 1002. It can be appreciated that by the use of one or more image processing technologies, one or more aspects of an eye, such as the pupil, can be identified and utilized to determine an eye position.

In addition, by the use of one or more suitable technologies, a reference point 1002 can be selected. A reference point 1002 can be based on a feature of the user, e.g., a tip of a nose, an eyebrow, a beauty mark, or a reference point 1002 can be in an arbitrary location. In the example of FIG. 10A, a point between the user's eyes is used as a reference point 1002. This example reference point 1002 is provided for illustrative purposes and is not to be construed as limiting. It can be appreciated that the reference point 1002 is can be in any suitable location, which can be based on an identifiable feature or characteristic of a user or any object.

As described above, a device 900 can generate a number of graphical elements at predetermined locations of the hardware display surface 902. As the graphical elements are displayed on the hardware display surface 902, the device 900 can prompt the user 112 to look at the graphical elements and provide an input to verify that the user is looking at the graphical elements. FIG. 10B illustrates an example view 1004 of a graphical element 1006 that can be generated by the device 900 to facilitate the calibration process. In this example, the device 900 generates a rendering of a graphical element 1006 in the center of the viewing area. While the graphical element 1006 is displayed, the device 900 can generate a prompt for the user 112 to verify that he or she is looking at the graphical element 1006. The prompt, as well as a user response to the prompt, can include a gesture, voice command, or other suitable types of input.

When the device 900 verifies that the user 112 is looking at the graphical element 1006, the device 900 can record one or more values indicating the position and/or the movement of at least one eye 908 of the user 112. For instance, one or more values described above and shown in FIG. 9B and FIG. 10A can be stored in a data structure in memory. It can be appreciated that any suitable value or a combination of values can be stored and utilized, including but not limited to, the first value ($D_3$) indicating the distance between the sensors 904 and at least one eye 904 of a user 112, the second value ($D_4$) indicating the distance between the eyes of a user 112, and other values ($D_5$, $D_6$, and $D_7$) indicating the distance between at least one eye 904 and a reference point 1002. These values are provided for illustrative purposes and are not to be construed as limiting. It can be appreciated that such values, subsets of such values, and other values of other measurements can be utilized in determining the movement and/or the position of one or more eyes of a user.

Figure 10E:
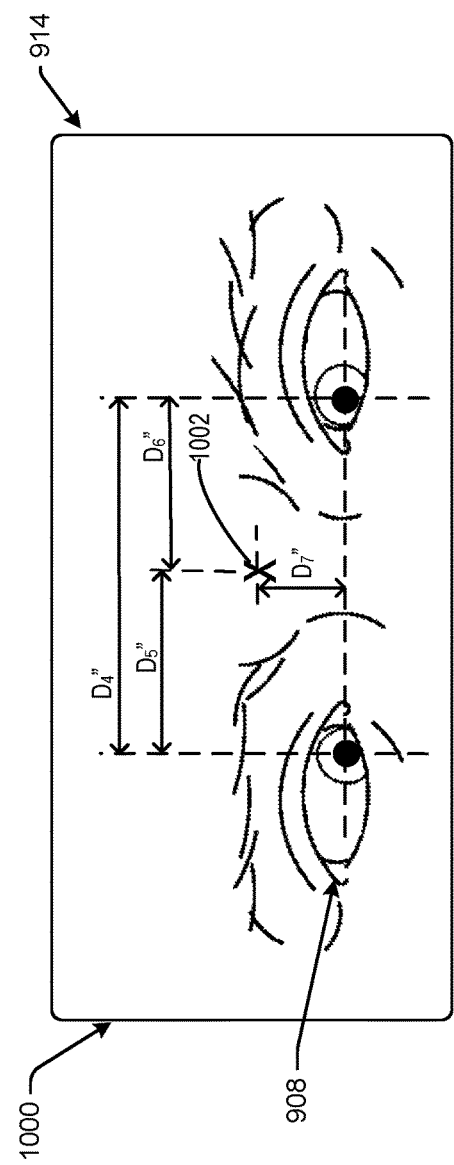
FIG. 10E is a schematic diagram showing yet another example of a device being used to calibrate one or more devices.
Figure 10F:
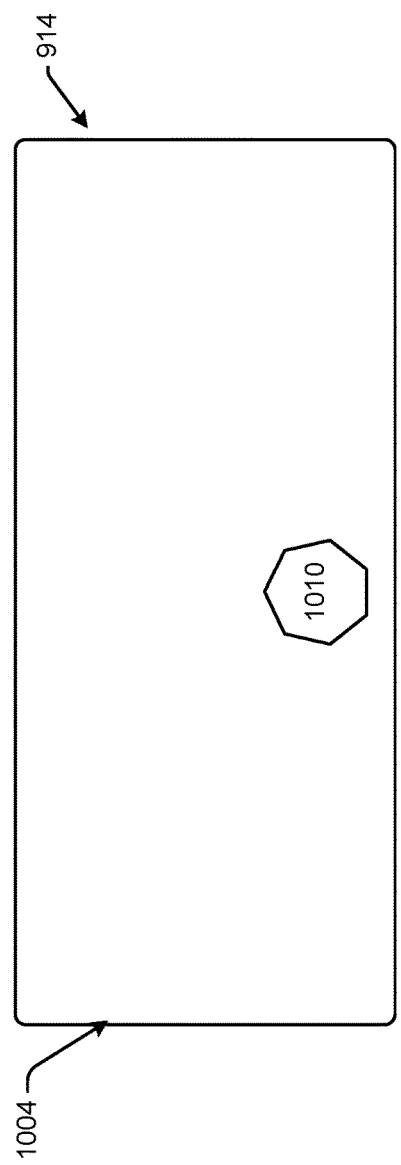
FIG. 10F is a schematic diagram showing another example of a device being used to calibrate one or more devices.

Other sets of values can be measured during the display of other graphical elements displayed in various positions. For example, as shown in FIG. 10C, a second set of values ($D_4'$, $D_5'$, $D_6'$, and $D_7'$) can be measured when a second graphical element 1008 is displayed, as shown in FIG. 10D. As shown in FIG. 10E, a third set of values ($D_4''$, $D_5''$, $D_6''$, and $D_7''$) can be measured when a third graphical element 1010 is displayed, as shown in FIG. 10F.

These example measurements and the locations of the graphical elements are provided for illustrative purposes. It can be appreciated that any number of graphical elements can be placed at different locations to obtain measurements that can be used to calibrate a device 900. For example, the device 900 can sequentially display a graphical element at pre-determined locations of the view 1004, such as each corner of the view 1004. As can be appreciated, more or fewer graphical elements can be used in the calibration process.

The values that indicate the position of at least one eye 908 at each pre-determined location can be used to generate calibration data. The calibration data can be configured to correlate the sets of eye position data with data identifying the positions of the graphical elements.

Any known technique suitable for generating calibration data can be used. It can be appreciated that the generation of calibration data can include extrapolation, projection and/or estimation technologies that can project correlations between sets of eye position data and various sections of a hardware display surface 902 and/or pixels of a hardware display surface 902. These examples are provided for illustrative purposes and are not to be construed as limiting, it can be appreciated that the values and/or calibration data can be obtained in other ways, including receiving such calibration data from one or more remote resources.

Once the calibration data is generated or obtained, such data and other data can be utilized by the device 102 to determine if a user 112 is looking at a particular gaze target, which can include a part of a hardware display surface 902, a rendered object, part of a rendered object, a real-world object, or part of a real-world object. FIGS. 11A-11F describes aspects of an example scenario where the device 900 having at least one sensor 904' is used to track the movement of at least one eye 908 of a user 112 to identify a gaze target.

Figure 11A:
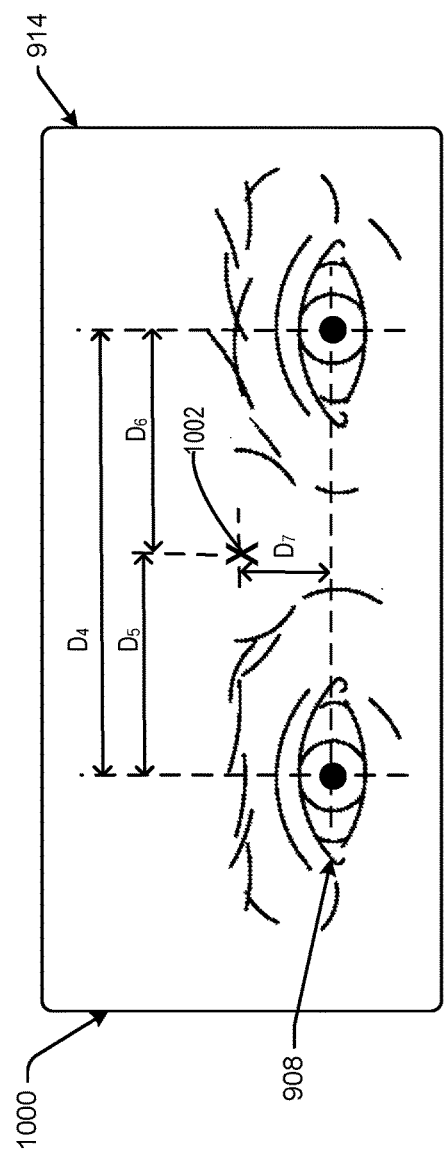
FIG. 11A is a schematic diagram showing an example of a device being used for tracking movement of at least one eye of a user to identify a gaze target.
Figure 11B:
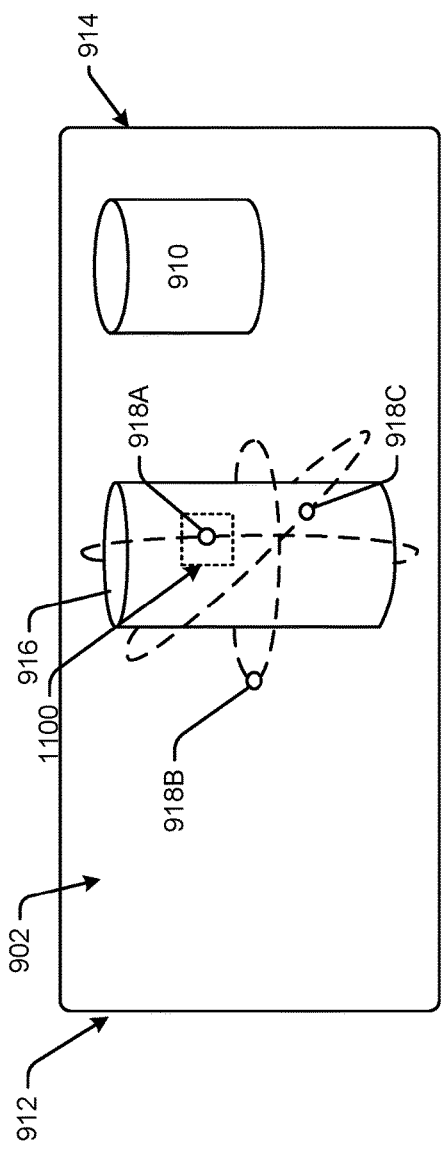
FIG. 11B is a schematic diagram showing another example of a device being used for tracking movement of at least one eye of a user to identify a gaze target.

Referring now to FIG. 11A and FIG. 11B, an example scenario showing the identification of a gaze target is shown and described. In this example, the user 112 is looking at the example view 912. As summarized above with reference to FIG. 9C, the example view 912 comprises both a view of a rendered object 916 on the hardware display surface 902 as well as a view of a real-world object 910 through the hardware display surface 902. While the user 112 is looking at the view 912, the sensor(s) 904' can cause the generation of one or more measured values, such as the values shown in the FIG. 11A. In some examples, using any combination of suitable technologies, such values can be compared against the calibration data and/or other data to identify a gaze target. In this example, one or more values measured in the scenario depicted in FIG. 11A can be processed with the calibration data to determine that the user 112 is looking at control point 918A. In such an example, the one or more measured values shown in FIG. 11A can also be used to determine that the user 112 is looking at a predetermined section of an interface, such as the first section 1100 of the hardware display surface 902 in FIG. 11B.

Figure 11C:
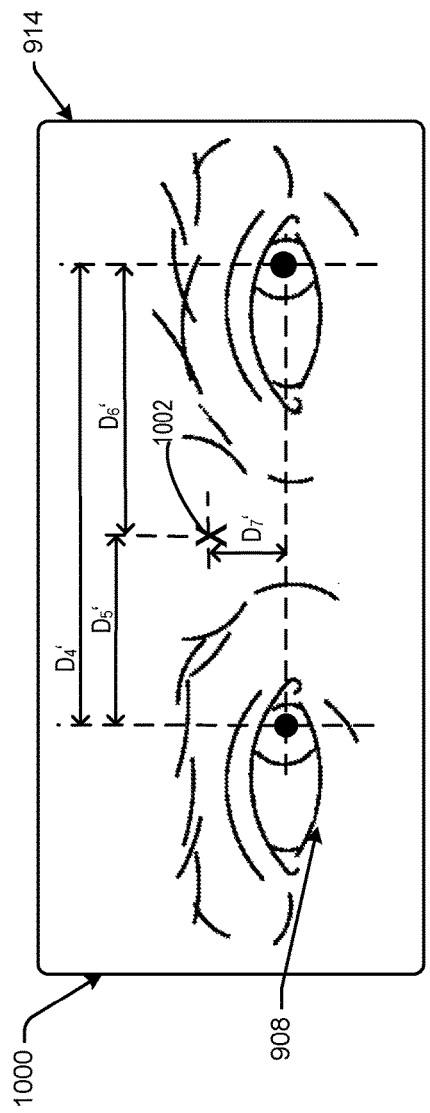
FIG. 11C is a schematic diagram showing yet another example of a device being used for tracking movement of at least one eye of a user to identify a gaze target.
Figure 11D:
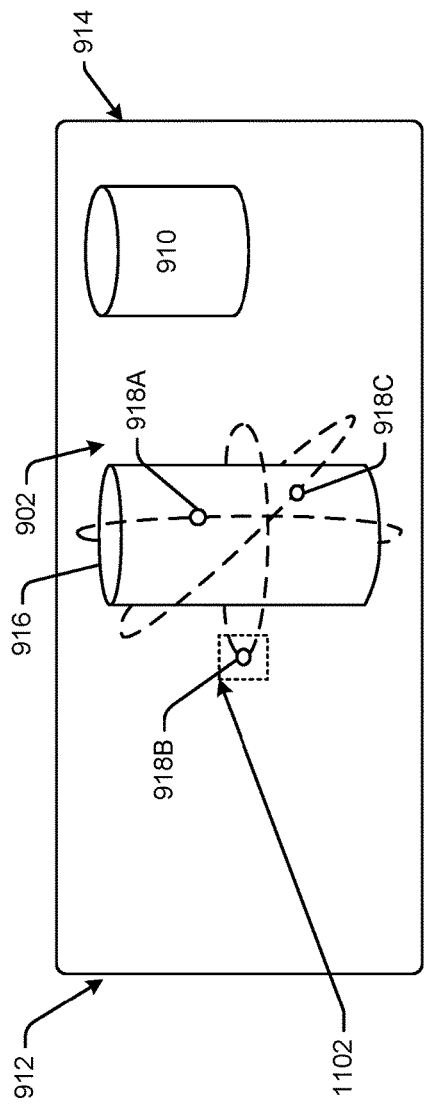
FIG. 11D is a schematic diagram showing another example of a device being used for tracking movement of at least one eye of a user to identify a gaze target.

In continuing the present example, one or more values measured in the scenario depicted in FIG. 11C can be processed with the calibration data to determine that the user 112 is looking at control point 918B. In such an example, the one or more measured values shown in FIG. 11C can also be used to determine that the user 112 is looking at a second section 1102 of the hardware display surface 902 in FIG. 11D.

Figure 11E:
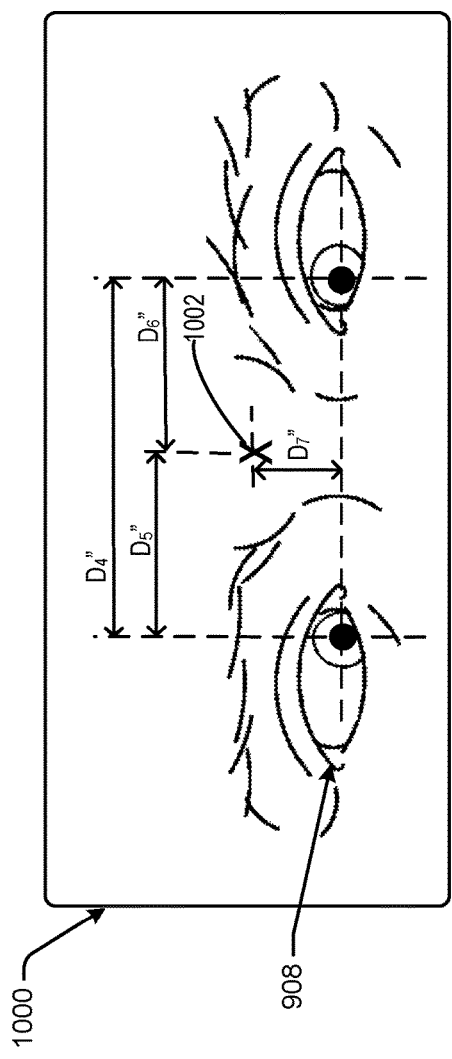
FIG. 11E is a schematic diagram showing yet another example of a device being used for tracking movement of at least one eye of a user to identify a gaze target.
Figure 11F:
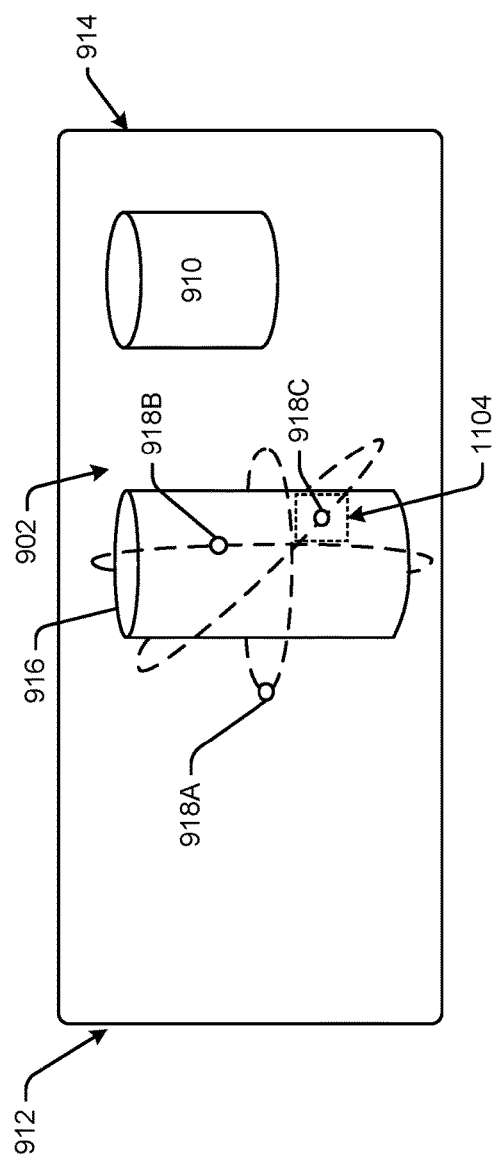
FIG. 11F is a schematic diagram showing another example of a device being used for tracking movement of at least one eye of a user to identify a gaze target.

In continuing the present example, one or more values measured in the scenario depicted in FIG. 11E can be processed with the calibration data to determine that the user 112 is looking at control point 918C. In such an example, the one or more measured values shown in FIG. 11E can be processed with the calibration data to determine that the user 112 is looking at a third section 1104 of the hardware display surface 902 in FIG. 11F.

In some examples, the device 900 can utilize data from a combination of resources to determine if a user 112 is looking at the real-world object 910 through the hardware display surface 902. As summarized above, a camera or other type of sensor 904 (FIG. 9A) mounted to the device 102 can be directed towards a user's field of view. Image data generated from the camera can be analyzed to determine if an object in the field of view is in a pre-determined position of an image of the image data. If an object is positioned within a pre-determined area of an image, such as the center of the image, a device can determine a gaze target processing such data with eye position data. Such data can be utilized to supplement other types of data, such as position data from a GPS and/or data generated from a compass or accelerometer, to enable a device 102 to determine a gaze direction, e.g., left, right, up, or down, and/or a gaze target.

Figure 12:
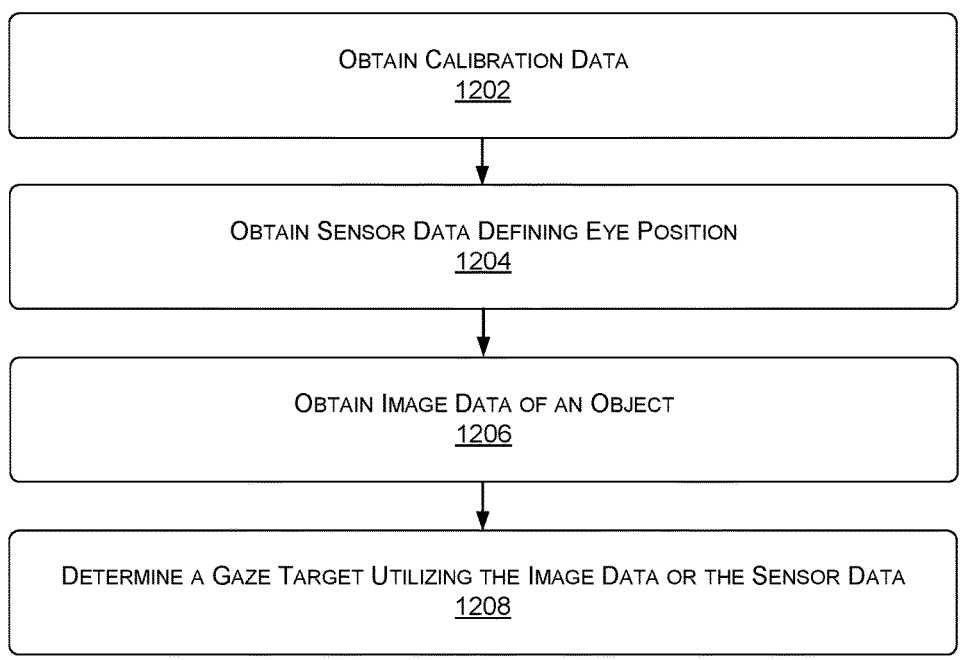
FIG. 12 is a flow diagram that illustrates an example process to identify a gaze target that is rendered on a hardware display surface or viewed through the hardware display surface.

Turning now to FIG. 12, aspects of an example process 1200 for determining a gaze target is shown and described below. In FIG. 12, device 900 can correspond to device 102, as described above.

Block 1202 illustrates obtaining calibration data. In at least one example, the operating system 114, or another module associated with the computer-readable media 106, can obtain calibration data. The calibration data can be stored in a data structure in the computer-readable media 106 or any computer readable storage medium for access at a later time. The calibration data can be generated by the device 900 or the calibration data can be received from a remote resource. In some examples, sensors 904' of a device 900 can be positioned to track the position of at least one eye of a user 112. The sensors 904' can cause the generation of one or more values that correlate the position of at least one eye of a user 112 with a particular section or position of a hardware display surface 902. Such examples can utilize an initialization process where the device 900 displays one or more graphical elements at pre-determined locations. During the display of the one or more graphical elements, one or more inputs from a user 112 can indicate that they are looking at the one or more graphical elements. In response to the input, a device can generate calibration data comprising the values that correlate the position of at least one eye of a user 112 with data identifying a particular position or section of a hardware display surface 902.

Block 1204 illustrates obtaining sensor data indicating the position of at least one eye of the user. In at least one example, the operating system 114, or another module associated with the computer-readable media 106, can obtain sensor data. The sensor data can be stored in a data structure in the computer-readable media 106 or any computer readable storage medium for access at a later time. As summarized above, sensor(s) 904' directed toward at least one eye of the user 112 can cause the generation of sensor data indicating the position of at least one eye of the user 112. The sensor data can be processed to generate data indicating a gaze direction of a user 112. As will be described below, the data indicating the gaze direction of the user 112 can be processed with the calibration data to determine if the user 112 is looking at a gaze target, which can include a rendered object displayed on the hardware display surface 902.

Block 1206 illustrates obtaining image data of an object. In at least one example, the operating system 114, or another module associated with the computer-readable media 106, can obtain sensor data. The image data of the object can be stored in a data structure in the computer-readable media 106 or any computer readable storage medium for access at a later time. In some examples, a camera or other type of sensor 904 mounted to a device 900 can be directed towards a user's field of view. The camera or other type of sensor 904 can cause the generation of image data, which can include one or more images of an object that is in the user's field of view. The image data can be in any suitable format and generated by any suitable sensor 904, which can include the use of a depth map sensor, camera, etc.

Block 1208 illustrates determining a gaze target utilizing the image data or the sensor data. In at least one example, the control point management module 122, or another module associated with the computer-readable media 106, can determine the gaze target. For instance, if a user 112 is looking at a real-world view of the object through the hardware display surface 902, and a sensor 904 directed towards the user's field of view generates image data of the object, the image data can be analyzed to determine if the object in the field of view is in a pre-determined position of an image of the image data. For example, if an object is positioned within a pre-determined area of an image, such as the center of the image, a device 900 can determine that the object is a gaze target. In another example, sensor data indicating the position of at least one eye of the user 112 can be processed with the calibration data and/or image data to determine if the user 112 is looking at a rendered object displayed on the hardware display surface 902. Such an example can be used to determine that the rendered object displayed on the hardware display surface 902 is a gaze target.

Figure 13:
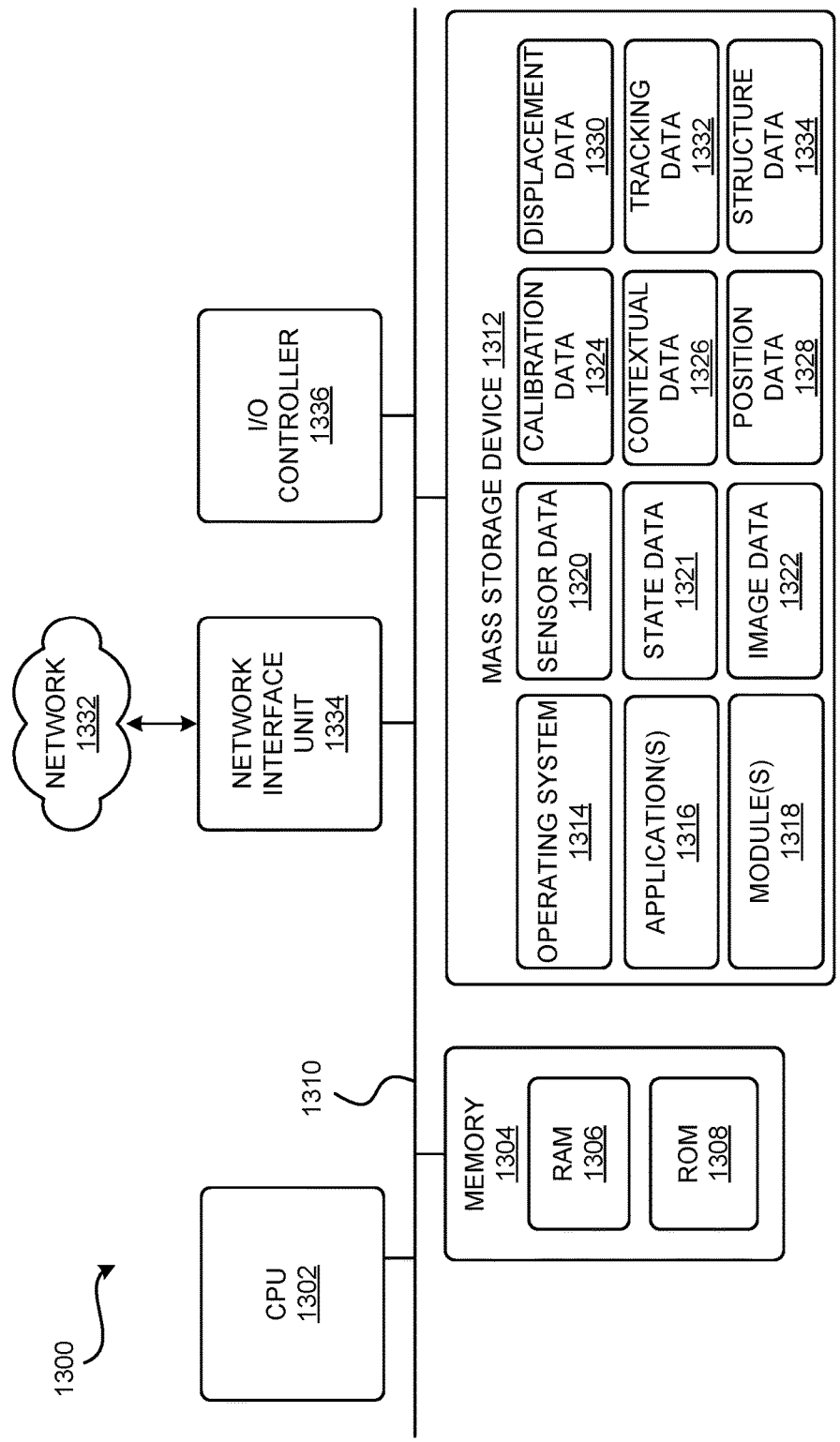
FIG. 13 is a computer architecture diagram illustrating an illustrative computer hardware and software architecture for a computing system capable of implementing aspects of the techniques and technologies presented herein.

FIG. 13 shows additional details of an example computer architecture 1300 for a computer, such as device 102 or server(s) 204 (FIGS. 1 and 2, respectively), capable of executing the program components described above for altering properties of rendered objects and/or mixed reality environments utilizing control points associated with the rendered objects and/or mixed reality environments. Thus, the computer architecture 1300 illustrated in FIG. 13 illustrates an architecture for a server computer, mobile phone, a PDA, a smart phone, a desktop computer, a netbook computer, a tablet computer, a laptop computer, and/or a wearable computer. The computer architecture 1300 can be utilized to execute any aspects of the software components presented herein.

The computer architecture 1300 illustrated in FIG. 13 includes a central processing unit 1202 (CPU), a system memory 1204, including a random access memory 1206 (RAM) and a read-only memory (ROM) 1208, and a system bus 1210 that couples the memory 1204 to the CPU 1202. A basic input/output system containing the basic routines that help to transfer information between elements within the computer architecture 1300, such as during startup, is stored in the ROM 1208. The computer architecture 1300 further includes a mass storage device 1312 for storing an operating system 1314 (e.g., operating system 116, server operating system 212, etc.), application(s) 1316 (e.g., application(s) 128, application(s) 124, etc.) programs, module(s) 1318 (e.g., gesture management module 116, control point management module 118, feedback module 120, property management module 122, rendering module 126, gesture management module 214, control point management module 216, feedback module 218, property management module 220, etc.), etc., as described above with reference to FIGS. 1 and 2. Additionally and/or alternatively, the mass storage device 1312 can store sensor data 1280, state data 1281, image data 1282, calibration data 1284, contextual data 1286, position data 1288, displacement data 1330, tracking data 1332, structure data 1334, etc., as described herein.

The mass storage device 1312 is connected to the CPU 1202 through a mass storage controller (not shown) connected to the bus 1210. The mass storage device 1312 and its associated computer-readable media provide non-volatile storage for the computer architecture 1300. Computer-readable media 106 and computer-readable media 210 can correspond to mass storage device 1312. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1300.

Communication media includes computer readable instructions, data structures, program modules, or other data in a modulated data signal such as a carrier wave or other transport mechanism and includes any delivery media. The term modulated data signal means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of communication media.

By way of example, and not limitation, computer storage media can include volatile and non-volatile, removable and non-removable media implemented in any method or technology for storage of information such as computer-readable instructions, data structures, program modules or other data. For example, computer storage media includes, but is not limited to, RAM, ROM, erasable programmable read-only memory (EPROM), electrically erasable programmable read-only memory (EEPROM), flash memory or other solid state memory technology, compact disc read-only memory (CD-ROM), digital versatile disks (DVD), high definition/density digital versatile/video disc (HD-DVD), BLU-RAY disc, or other optical storage, magnetic cassettes, magnetic tape, magnetic disk storage or other magnetic storage devices, or any other medium which can be used to store the desired information and which can be accessed by the computer architecture 1300. For purposes of the claims, the phrase "computer storage medium," "computer-readable storage medium," and variations thereof, does not include waves, signals, and/or other transitory and/or intangible communication media, per se.

According to various configurations, the computer architecture 1300 can operate in a networked environment using logical connections to remote computers through the network 1332 and/or another network (not shown). The computer architecture 1300 can connect to the network 1332 through a network interface unit 1334 connected to the bus 1210. It should be appreciated that the network interface unit 1334 also can be utilized to connect to other types of networks and remote computer systems. The computer architecture 1300 also can include an input/output controller 1336 for receiving and processing input from input device(s) or input interface(s) (e.g., input interface(s) 108), including a keyboard, mouse, or electronic stylus (not shown in FIG. 13). Similarly, the input/output controller 1336 can provide output to a display screen, a printer, other type of output device, or output interface (also not shown in FIG. 13). The input/output controller 1336 can receive and process data from the input interface(s) 108 and/or output interface(s) 110 described above with reference to FIG. 1.

It should be appreciated that the software components described herein can, when loaded into the CPU 1202 and executed, transform the CPU 1202 and the overall computer architecture 1300 from a general-purpose computing system into a special-purpose computing system customized to facilitate the functionality presented herein. The CPU 1202 can be constructed from any number of transistors or other discrete circuit elements, which can individually or collectively assume any number of states. More specifically, the CPU 1202 can operate as a finite-state machine, in response to executable instructions contained within the software modules described herein. These computer-executable instructions can transform the CPU 1202 by specifying how the CPU 1202 transitions between states, thereby transforming the transistors or other discrete hardware elements constituting the CPU 1202. Processor(s) 104, processor(s) 206, and processor(s) 208 can correspond to CPU 1202.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software described herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media described herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1300 in order to store and execute the software components presented herein. It also should be appreciated that the computer architecture 1300 can include other types of computing entities, including hand-held computers, embedded computer systems, personal digital assistants, and other types of computing entities known to those skilled in the art. It is also contemplated that the computer architecture 1300 may not include all of the components shown in FIG. 13, can include other components that are not explicitly shown in FIG. 13, or can utilize an architecture completely different than that shown in FIG. 13.

Figure 14:
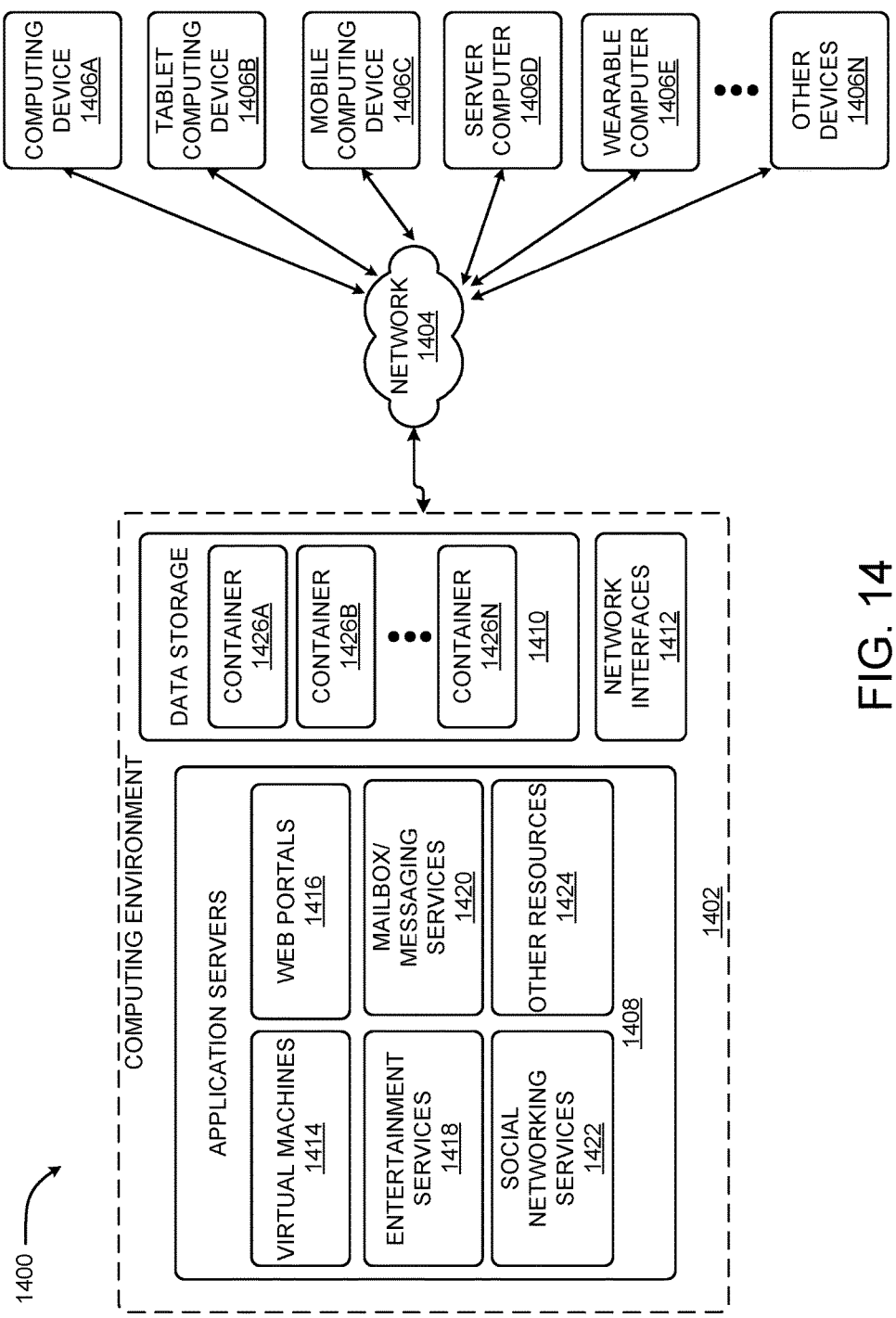
FIG. 14 is a diagram illustrating a distributed computing environment capable of implementing aspects of the techniques and technologies presented herein.

FIG. 14 depicts an illustrative distributed computing environment 1400 capable of executing the software components described herein for altering properties of rendered objects and/or mixed reality environments utilizing control points associated with the rendered objects and/or mixed reality environments. Thus, the distributed computing environment 1400 illustrated in FIG. 14 can be utilized to execute any aspects of the software components presented herein. For example, the distributed computing environment 1400 can be utilized to execute aspects of the techniques described herein.

According to various implementations, the distributed computing environment 1400 includes a computing environment 1402 operating on, in communication with, or as part of a network 206. In at least one example, at least some of computing environment 1402 can correspond to the one or more servers 204. The network 1404 can be or can include network 206, described above with reference to FIG. 2. The network 1404 also can include various access networks. One or more client devices 1406A-1406N (hereinafter referred to collectively and/or generically as clients 1406) can communicate with the computing environment 1402 via the network 1404 and/or other connections (not illustrated in FIG. 14). Device 102 in FIG. 2 and device 900 in FIG. 9 can correspond to any one of the client devices of the client devices 1406A-1406N. In one illustrated configuration, the clients 1406 include a computing device 1406A such as a laptop computer, a desktop computer, or other computing device, a slate or tablet computing device (tablet computing device) 1406B, a mobile computing device 1406C such as a mobile telephone, a smart phone, or other mobile computing device, a server computer 1406D, a wearable computer 1406E, and/or other devices 1406N. It should be understood that any number of clients 1406 can communicate with the computing environment 1402. Two example computing architectures for the clients 1406 are illustrated and described herein with reference to FIGS. 13 and 15. It should be understood that the illustrated clients 1406 and computing architectures illustrated and described herein are illustrative, and should not be construed as being limited in any way.

In the illustrated configuration, the computing environment 1402 includes application servers 1408, data storage 1410, and one or more network interfaces 1412. According to various implementations, the functionality of the application servers 1408 can be provided by one or more server computers that are executing as part of, or in communication with, the network 206. The computing environment 1402 can correspond to the one or more servers 204 in FIG. 2. It should be understood that this configuration is illustrative, and should not be construed as being limited in any way. For instance, as described above, in some examples, the application servers 1408 can be associated with the device 102 (e.g., application(s) 128).

In at least one example, the application servers 1408 can host various services, virtual machines, portals, and/or other resources. In the illustrated configuration, the application servers 1408 can host one or more virtual machines 1414 for executing applications or other functionality. According to various implementations, the virtual machines 1414 can execute one or more applications and/or software modules for altering properties of rendered objects utilizing control points associated with the rendered objects. The application servers 1408 also host or provide access to one or more portals, link pages, Web sites, and/or other information (Web portals) 1416. The Web portals 1416 can be used to communicate with one or more client computers. The application servers 1408 can include one or more entertainment services 1418. The entertainment services 1418 can include various gaming experiences for one or more users 112.

According to various implementations, the application servers 1408 also include one or more mailbox and/or messaging services 1420. The mailbox and/or messaging services 1420 can include electronic mail (email) services, various personal information management (PIM) services (e.g., calendar services, contact management services, collaboration services, etc.), instant messaging services, chat services, forum services, and/or other communication services.

The application servers 1408 also can include one or more social networking services 1422. The social networking services 1422 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1422 are provided by or include the FACEBOOK® social networking service, the LINKEDIN® professional networking service, the MYSPACE® social networking service, the FOURSQUARE® geographic networking service, the YAMMER® office colleague networking service, and the like. In other configurations, the social networking services 1422 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like.

The social networking services 1422 also can include commenting, blogging, and/or micro blogging services. Examples of such services include, but are not limited to, the YELP® commenting service, the KUDZU® review service, the OFFICETALK® enterprise micro blogging service, the TWITTER® messaging service, the GOOGLE BUZZ® service, and/or other services. It should be appreciated that the above lists of services are not exhaustive and that numerous additional and/or alternative social networking services 1422 are not mentioned herein for the sake of brevity. As such, the above configurations are illustrative, and should not be construed as being limited in any way. According to various implementations, the social networking services 1422 can host one or more applications and/or software modules for providing the functionality described herein for providing contextually-aware location sharing services for computing devices. For instance, any one of the application servers 1408 can communicate or facilitate the functionality and features described herein. For instance, a social networking application, mail client, messaging client, a browser running on a phone or any other client 1406 can communicate with a social networking service 1422.

As shown in FIG. 14, the application servers 1408 also can host other services, applications, portals, and/or other resources (other resources) 1424. The other resources 1424 can deploy a service-oriented architecture or any other client-server management software. It thus can be appreciated that the computing environment 1402 can provide integration of the concepts and technologies described herein with various mailbox, messaging, social networking, and/or other services or resources.

As mentioned above, the computing environment 1402 can include the data storage 1410. According to various implementations, the functionality of the data storage 1410 is provided by one or more databases operating on, or in communication with, the network 206. The functionality of the data storage 1410 also can be provided by one or more server computers configured to host data for the computing environment 1402. The data storage 1410 can include, host, or provide one or more real or virtual containers 1430A-1430N (hereinafter referred to collectively and/or generically as containers 1430). Although not illustrated in FIG. 14, the containers 1430 also can host or store data structures and/or algorithms for execution by a module, such as the gesture management module 214, the control point management module 216, the feedback module 218, the property management module 220, etc. Aspects of the containers 1430 can be associated with a database program, file system and/or any program that stores data with secure access features. Aspects of the containers 1430 can also be implemented using products or services, such as ACTIVE DIRECTORY®, DKM®, ONEDRIVE®, DROPBOX® or GOOGLEDRIVE®.

The computing environment 1402 can communicate with, or be accessed by, the network interfaces 1412. The network interfaces 1412 can include various types of network hardware and software for supporting communications between two or more computing entities including, but not limited to, the clients 1406 and the application servers 1408. It should be appreciated that the network interfaces 1412 also can be utilized to connect to other types of networks and/or computer systems.

It should be understood that the distributed computing environment 1400 described herein can provide any aspects of the software elements described herein with any number of virtual computing resources and/or other distributed computing functionality that can be configured to execute any aspects of the software components described herein. According to various implementations of the concepts and technologies described herein, the distributed computing environment 1400 provides the software functionality described herein as a service to the clients 1406. It should be understood that the clients 1406 can include real or virtual machines including, but not limited to, server computers, web servers, personal computers, mobile computing entities, smart phones, and/or other devices. As such, various configurations of the concepts and technologies described herein enable any device configured to access the distributed computing environment 1400 to utilize the functionality described herein for altering properties of rendered objects utilizing control points associated with the rendered objects, among other aspects. In one specific example, as summarized above, techniques described herein can be implemented, at least in part, by a web browser application that can work in conjunction with the application servers 1408 of FIG. 14.

Figure 15:
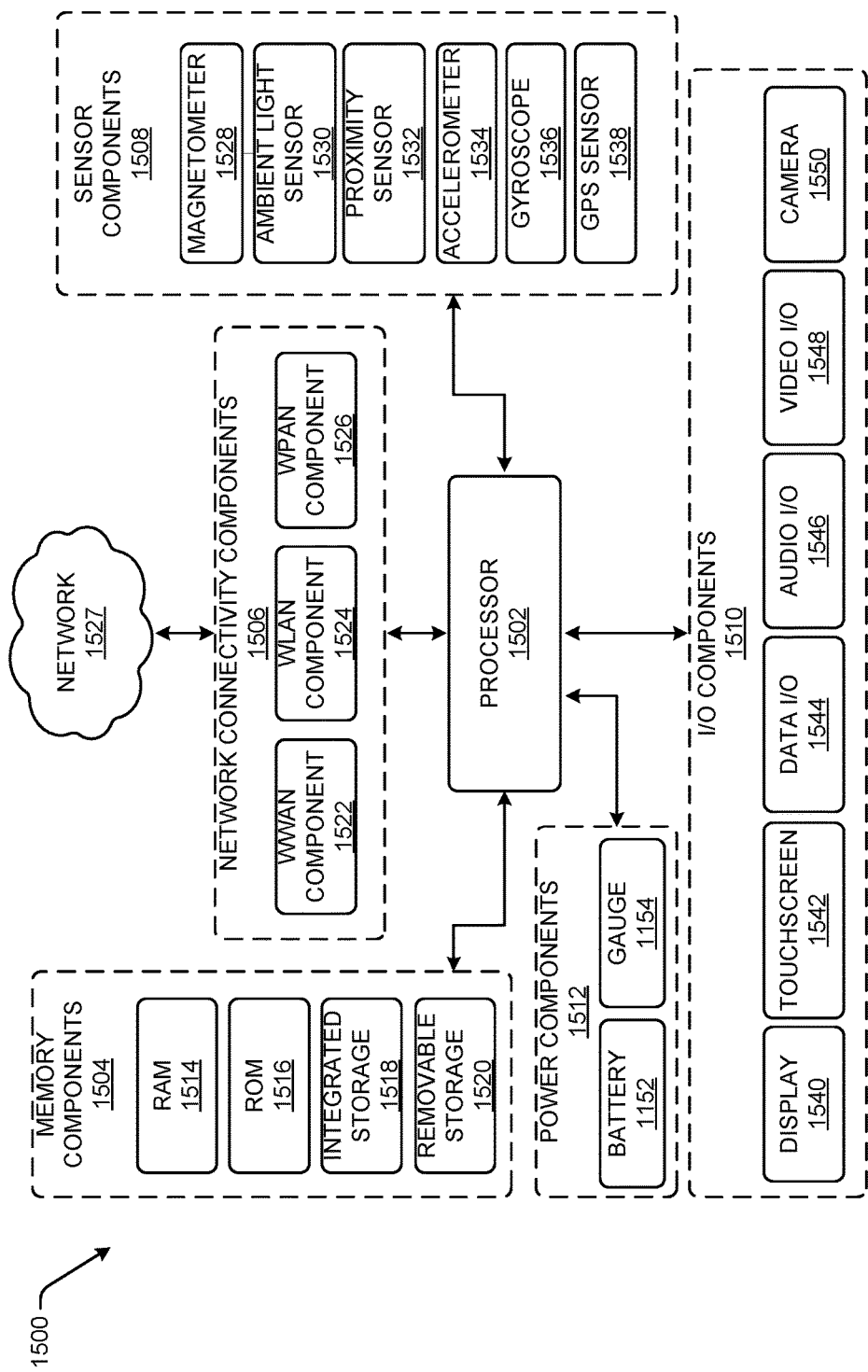
FIG. 15 is a computer architecture diagram illustrating a computing device architecture for a computing device capable of implementing aspects of the techniques and technologies presented herein.

Turning now to FIG. 15, an illustrative computing device architecture 1500 for a computing device that is capable of executing various software components described herein for altering properties of rendered objects and/or mixed reality environments utilizing control points associated with the rendered objects and/or mixed reality environments. The computing device architecture 1500 is applicable to computing entities that facilitate mobile computing due, in part, to form factor, wireless connectivity, and/or battery-powered operation. In some configurations, the computing entities include, but are not limited to, mobile telephones, tablet devices, slate devices, wearable devices, portable video game devices, and the like. The computing device architecture 1500 is applicable to any of the clients 1006 shown in FIG. 14 (e.g., device 102, device 900). Moreover, aspects of the computing device architecture 1500 can be applicable to traditional desktop computers, portable computers (e.g., laptops, notebooks, ultra-portables, and netbooks), server computers, and other computer systems, such as described herein with reference to FIG. 13 (e.g., server(s) 204). For example, the various aspects described herein below can be applied to desktop computers that utilize a touchscreen or some other touch-enabled device, such as a touch-enabled track pad or touch-enabled mouse.

The computing device architecture 1500 illustrated in FIG. 15 includes a processor 1502, memory components 1504, network connectivity components 1506, sensor components 1508, input/output components 1510, and power components 1512. In the illustrated configuration, the processor 1502 is in communication with the memory components 1504, the network connectivity components 1506, the sensor components 1508, the input/output (I/O) components 1510, and the power components 1512. Although no connections are shown between the individual components illustrated in FIG. 15, the components can interact to carry out device functions. In some configurations, the components are arranged so as to communicate via one or more busses (not shown).

The processor 1502 includes a central processing unit (CPU) configured to process data, execute computer-executable instructions of one or more application programs, and communicate with other components of the computing device architecture 1500 in order to perform various functionality described herein. The processor 1502 can be utilized to execute aspects of the software components presented herein. The processor 1502 can correspond to processor(s) 104, processor(s) 208, as described above in reference to FIGS. 1 and 2, respectively.

In some configurations, the processor 1502 includes a graphics processing unit (GPU) configured to accelerate operations performed by the CPU, including, but not limited to, operations performed by executing general-purpose scientific and/or engineering computing applications, as well as graphics-intensive computing applications such as high resolution video (e.g., 1520P, 1080P, and higher resolution), video games, three-dimensional modeling applications, and the like. In some configurations, the processor 1502 is configured to communicate with a discrete GPU (not shown). In any case, the CPU and GPU can be configured in accordance with a co-processing CPU/GPU computing model, wherein the sequential part of an application executes on the CPU and the computationally-intensive part is accelerated by the GPU.

In additional and/or alternative configurations, the processor 1502 can include a holographic processing unit (HPU) that can receive data from the sensor components 1508 and/or I/O components 1510. The HPU can process the data and can integrate the data into a real-world environment to enable mixed reality environments.

In some configurations, the processor 1502 is, or is included in, a System-on-Chip (SoC) along with one or more of the other components described herein below. For example, the SoC can include the processor 1502, a GPU, one or more of the network connectivity components 1506, and one or more of the sensor components 1508. In some configurations, the processor 1502 is fabricated, in part, utilizing a Package-on-Package (PoP) integrated circuit packaging technique. The processor 1502 can be a single core or multi-core processor.

The processor 1502 can be created in accordance with an ARM architecture, available for license from ARM HOLDINGS of Cambridge, United Kingdom. Alternatively, the processor 1502 can be created in accordance with an x86 architecture, such as is available from INTEL CORPORATION of Mountain View, Calif. and others. In some configurations, the processor 1502 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform (OMAP) SoC, available from TEXAS INSTRUMENTS of Dallas, Tex., a customized version of any of the above SoCs, or a proprietary SoC.

The memory components 1504 include a random access memory (RAM) 1514, a read-only memory (ROM) 1516, an integrated storage memory (integrated storage) 1518, and a removable storage memory (removable storage) 1520. In some configurations, the RAM 1514 or a portion thereof, the ROM 1516 or a portion thereof, and/or some combination the RAM 1514 and the ROM 1516 is integrated in the processor 1502. In some configurations, the ROM 1516 is configured to store a firmware, an operating system or a portion thereof (e.g., operating system kernel), and/or a bootloader to load an operating system kernel from the integrated storage 1518 and/or the removable storage 1520. The memory components 1504 can correspond to computer-readable media 106 and computer-readable media 210, as described above in reference to FIGS. 1 and 2, respectively.

The integrated storage 1518 can include a solid-state memory, a hard disk, or a combination of solid-state memory and a hard disk. The integrated storage 1518 can be soldered or otherwise connected to a logic board upon which the processor 1502 and other components described herein also can be connected. As such, the integrated storage 1518 is integrated in the computing device. The integrated storage 1518 is configured to store an operating system or portions thereof, application programs, data, and other software components described herein.

The removable storage 1520 can include a solid-state memory, a hard disk, or a combination of solid-state memory and a hard disk. In some configurations, the removable storage 1520 is provided in lieu of the integrated storage 1518. In other configurations, the removable storage 1520 is provided as additional optional storage. In some configurations, the removable storage 1520 is logically combined with the integrated storage 1518 such that the total available storage is made available as a total combined storage capacity. In some configurations, the total combined capacity of the integrated storage 1518 and the removable storage 1520 is shown to a user instead of separate storage capacities for the integrated storage 1518 and the removable storage 1520.

The removable storage 1520 is configured to be inserted into a removable storage memory slot (not shown) or other mechanism by which the removable storage 1520 is inserted and secured to facilitate a connection over which the removable storage 1520 can communicate with other components of the computing device, such as the processor 1502. The removable storage 1520 can be embodied in various memory card formats including, but not limited to, PC card, CompactFlash card, memory stick, secure digital (SD), miniSD, microSD, universal integrated circuit card (UICC) (e.g., a subscriber identity module (SIM) or universal SIM (USIM)), a proprietary format, or the like.

It can be understood that one or more of the memory components 1504 can store an operating system. According to various configurations, the operating system includes, but is not limited to, SYMBIAN OS from SYMBIAN LIMITED, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1506 include a wireless wide area network component (WWAN component) 1522, a wireless local area network component (WLAN component) 1524, and a wireless personal area network component (WPAN component) 1526. The network connectivity components 1506 facilitate communications to and from the network 1527 or another network, which can be a WWAN, a WLAN, or a WPAN. Although only the network 1527 is illustrated, the network connectivity components 1506 can facilitate simultaneous communication with multiple networks, including the network 1527 of FIG. 15. For example, the network connectivity components 1506 can facilitate simultaneous communications with multiple networks via one or more of a WWAN, a WLAN, or a WPAN.

The network 1527 can be or can include a WWAN, such as a mobile telecommunications network utilizing one or more mobile telecommunications technologies to provide voice and/or data services to a computing device utilizing the computing device architecture 1500 via the WWAN component 1522. The mobile telecommunications technologies can include, but are not limited to, Global System for Mobile communications (GSM), Code Division Multiple Access (CDMA) ONE, CDMA2000, Universal Mobile Telecommunications System (UMTS), Long Term Evolution (LTE), and Worldwide Interoperability for Microwave Access (WiMAX). Moreover, the network 1527 can utilize various channel access methods (which can or cannot be used by the aforementioned standards) including, but not limited to, Time Division Multiple Access (TDMA), Frequency Division Multiple Access (FDMA), CDMA, wideband CDMA (W-CDMA), Orthogonal Frequency Division Multiplexing (OFDM), Space Division Multiple Access (SDMA), and the like. Data communications can be provided using General Packet Radio Service (GPRS), Enhanced Data rates for Global Evolution (EDGE), the High-Speed Packet Access (HSPA) protocol family including High-Speed Downlink Packet Access (HSDPA), Enhanced Uplink (EUL) or otherwise termed High-Speed Uplink Packet Access (HSUPA), Evolved HSPA (HSPA+), LTE, and various other current and future wireless data access standards. The network 1527 can be configured to provide voice and/or data communications with any combination of the above technologies. The network 104 can be configured to or adapted to provide voice and/or data communications in accordance with future generation technologies.

In some configurations, the WWAN component 1522 is configured to provide dual-multi-mode connectivity to the network 1527. For example, the WWAN component 1522 can be configured to provide connectivity to the network 1527, wherein the network 1527 provides service via GSM and UMTS technologies, or via some other combination of technologies. Alternatively, multiple WWAN components 1522 can be utilized to perform such functionality, and/or provide additional functionality to support other non-compatible technologies (i.e., incapable of being supported by a single WWAN component). The WWAN component 1522 can facilitate similar connectivity to multiple networks (e.g., a UMTS network and an LTE network).

The network 1527 can be a WLAN operating in accordance with one or more Institute of Electrical and Electronic Engineers (IEEE) 802.15 standards, such as IEEE 802.15a, 802.15b, 802.15g, 802.15n, and/or future 802.15 standard (referred to herein collectively as WI-FI). Draft 802.15 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1524 is configured to connect to the network 104 via the WI-FI access points. Such connections can be secured via various encryption technologies including, but not limited, WI-FI Protected Access (WPA), WPA2, Wired Equivalent Privacy (WEP), and the like.

The network 1527 can be a WPAN operating in accordance with Infrared Data Association (IrDA), BLUETOOTH, wireless Universal Serial Bus (USB), Z-Wave, ZIGBEE, or some other short-range wireless technology. In some configurations, the WPAN component 1526 is configured to facilitate communications with other devices, such as peripherals, computers, or other computing entities via the WPAN.

In at least one example, the sensor components 1508 can include a magnetometer 1528, an ambient light sensor 1530, a proximity sensor 1532, an accelerometer 1534, a gyroscope 1536, and a Global Positioning System sensor (GPS sensor) 1538. It is contemplated that other sensors, such as, but not limited to, temperature sensors or shock detection sensors, also can be incorporated in the computing device architecture 1500. While the sensor components 1508 are shown separate from the I/O components 1510, in some examples, the sensor components 1508 can be considered I/O components 1510.

The magnetometer 1528 is configured to measure the strength and direction of a magnetic field. In some configurations the magnetometer 1528 provides measurements to a compass application program stored within one of the memory components 1504 in order to provide a user with accurate directions in a frame of reference including the cardinal directions, north, south, east, and west. Similar measurements can be provided to a navigation application program that includes a compass component. Other uses of measurements obtained by the magnetometer 1528 are contemplated.

The ambient light sensor 1530 is configured to measure ambient light. In some configurations, the ambient light sensor 1530 provides measurements to an application program stored within one the memory components 1504 in order to automatically adjust the brightness of a display (described below) to compensate for low-light and high-light environments. Other uses of measurements obtained by the ambient light sensor 1530 are contemplated.

The proximity sensor 1532 is configured to determine the presence of an object or thing in proximity to the computing device without direct contact. In some configurations, the proximity sensor 1532 detects the presence of a user's body (e.g., the user's face) and provides this information to an application program stored within one of the memory components 1504 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 1528 are contemplated.

The accelerometer 1534 is configured to measure proper acceleration. In some configurations, output from the accelerometer 1534 is used by an application program as an input mechanism to control some functionality of the application program. For example, the application program can be a video game in which a character, a portion thereof, or an object is moved or otherwise manipulated in response to input received via the accelerometer 1534. In some configurations, output from the accelerometer 1534 is provided to an application program for use in switching between landscape and portrait modes, calculating coordinate acceleration, or detecting a fall. Other uses of the accelerometer 1534 are contemplated.

The gyroscope 1536 is configured to measure and maintain orientation. In some configurations, output from the gyroscope 1536 is used by an application program as an input mechanism to control some functionality of the application program. For example, the gyroscope 1536 can be used for accurate recognition of movement within a 3D environment of a video game application or some other application. In some configurations, an application program utilizes output from the gyroscope 1536 and the accelerometer 1534 to enhance control of some functionality of the application program. Other uses of the gyroscope 1536 are contemplated.

The GPS sensor 1538 is configured to receive signals from GPS satellites for use in calculating a location. The location calculated by the GPS sensor 1538 can be used by any application program that requires or benefits from location information. For example, the location calculated by the GPS sensor 1538 can be used with a navigation application program to provide directions from the location to a destination or directions from the destination to the location. Moreover, the GPS sensor 1538 can be used to provide location information to an external location-based service, such as E1515 service. The GPS sensor 1538 can obtain location information generated via WI-FI, WIMAX, and/or cellular triangulation techniques utilizing one or more of the network connectivity components 1506 to aid the GPS sensor 1538 in obtaining a location fix. The GPS sensor 1538 can also be used in Assisted GPS (A-GPS) systems.

In at least one example, the I/O components 1510 can correspond to the input interface(s) 108 and/or output interface(s) 110, described above with reference to FIG. 1. Additionally and/or alternatively, the I/O components can include a display 1540, a touchscreen 1542, a data I/O interface component (data I/O) 1544, an audio I/O interface component (audio I/O) 1546, a video I/O interface component (video I/O) 1548, and a camera 1550. In some configurations, the display 1540 and the touchscreen 1542 are combined. In some configurations two or more of the data I/O component 1544, the audio I/O component 1546, and the video I/O component 1548 are combined. The I/O components 1510 can include discrete processors configured to support the various interface described below, or can include processing functionality built-in to the processor 1502.

The display 1540 is an output device configured to present information in a visual form. In particular, the display 1540 can present graphical user interface (GUI) elements, text, images, video, notifications, virtual buttons, virtual keyboards, messaging data, Internet content, device status, time, date, calendar data, preferences, map information, location information, and any other information that is capable of being presented in a visual form. In some configurations, the display 1540 is a liquid crystal display (LCD) utilizing any active or passive matrix technology and any backlighting technology (if used). In some configurations, the display 1540 is an organic light emitting diode (OLED) display. Other display types are contemplated.

In at least one example, the display 1540 can correspond to the hardware display surface. As described above, the hardware display surface can be configured to graphically associate holographic user interfaces and other graphical elements with an object seen through the hardware display surface or rendered objects displayed on the hardware display surface. Additional features associated with the hardware display device are described above with reference to FIG. 1.

The touchscreen 1542, also referred to herein as a touch-enabled screen, is an input device configured to determine the presence and location of a touch. The touchscreen 1542 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 1542 is incorporated on top of the display 1540 as a transparent layer to enable a user to use one or more touches to interact with objects or other information presented on the display 1540. In other configurations, the touchscreen 1542 is a touch pad incorporated on a surface of the computing device that does not include the display 1540. For example, the computing device can have a touchscreen incorporated on top of the display 1540 and a touch pad on a surface opposite the display 1540.

In some configurations, the touchscreen 1542 is a single-touch touchscreen. In other configurations, the touchscreen 1542 is a multi-touch touchscreen. In some configurations, the touchscreen 1542 is configured to determine discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 1542. As such, a developer can create gestures that are specific to a particular application program.

In some configurations, the touchscreen 1542 supports a tap gesture in which a user taps the touchscreen 1542 once on an item presented on the display 1540. The tap gesture can be used to perform various functions including, but not limited to, opening or launching whatever the user taps. In some configurations, the touchscreen 1542 supports a double tap gesture in which a user taps the touchscreen 1542 twice on an item presented on the display 1540. The double tap gesture can used to perform various functions including, but not limited to, zooming in or zooming out in stages. In some configurations, the touchscreen 1542 supports a tap and hold gesture in which a user taps the touchscreen 1542 and maintains contact for at least a pre-defined time. The tap and hold gesture can be used to perform various functions including, but not limited to, opening a context-specific menu.

In some configurations, the touchscreen 1542 supports a pan gesture in which a user places a finger on the touchscreen 1542 and maintains contact with the touchscreen 1542 while moving the finger on the touchscreen 1542. The pan gesture can be used to perform various functions including, but not limited to, moving through screens, images, or menus at a controlled rate. Multiple finger pan gestures are also contemplated. In some configurations, the touchscreen 1542 supports a flick gesture in which a user swipes a finger in the direction the user wants the screen to move. The flick gesture can be used to perform various functions including, but not limited to, scrolling horizontally or vertically through menus or pages. In some configurations, the touchscreen 1542 supports a pinch and stretch gesture in which a user makes a pinching motion with two fingers (e.g., thumb and forefinger) on the touchscreen 1542 or moves the two fingers apart. The pinch and stretch gesture can be used to perform various functions including, but not limited to, zooming gradually in or out of a web site, map, or picture.

Although the above gestures have been described with reference to the use of one or more fingers for performing the gestures, other appendages such as toes or objects such as styluses can be used to interact with the touchscreen 1542. As such, the above gestures should be understood as being illustrative and should not be construed as being limited in any way.

The data I/O interface component 1544 is configured to facilitate input of data to the computing device and output of data from the computing device. In some configurations, the data I/O interface component 1544 includes a connector configured to provide wired connectivity between the computing device and a computer system, for example, for synchronization operation purposes. The connector can be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1546 is configured to provide audio input and/or output capabilities to the computing device. In some configurations, the audio I/O interface component 1546 includes a microphone configured to collect audio signals. In some configurations, the audio I/O interface component 1546 includes a headphone jack configured to provide connectivity for headphones or other external speakers. In some configurations, the audio I/O interface component 1546 includes a speaker for the output of audio signals. In some configurations, the audio I/O interface component 1546 includes an optical audio cable out.

The video I/O interface component 1548 is configured to provide video input and/or output capabilities to the computing device. In some configurations, the video I/O interface component 1548 includes a video connector configured to receive video as input from another device (e.g., a video media player such as a DVD or BLURAY player) or send video as output to another device (e.g., a monitor, a television, or some other external display). In some configurations, the video I/O interface component 1548 includes a High-Definition Multimedia Interface (HDMI), mini-HDMI, micro-HDMI, DisplayPort, or proprietary connector to input/output video content. In some configurations, the video I/O interface component 1548 or portions thereof is combined with the audio I/O interface component 1546 or portions thereof.

The camera 1550 can be configured to capture still images and/or video. The camera 1550 can utilize a charge coupled device (CCD) or a complementary metal oxide semiconductor (CMOS) image sensor to capture images. In some configurations, the camera 1550 includes a flash to aid in taking pictures in low-light environments. Settings for the camera 1550 can be implemented as hardware or software buttons.

Although not illustrated, one or more hardware buttons can also be included in the computing device architecture 1500. The hardware buttons can be used for controlling some operational aspect of the computing device. The hardware buttons can be dedicated buttons or multi-use buttons. The hardware buttons can be mechanical or sensor-based.

The illustrated power components 1512 include one or more batteries 1552, which can be connected to a battery gauge 1554. The batteries 1552 can be rechargeable or disposable. Rechargeable battery types include, but are not limited to, lithium polymer, lithium ion, nickel cadmium, and nickel metal hydride. Each of the batteries 1552 can be made of one or more cells.

The battery gauge 1554 can be configured to measure battery parameters such as current, voltage, and temperature. In some configurations, the battery gauge 1554 is configured to measure the effect of a battery's discharge rate, temperature, age and other factors to predict remaining life within a certain percentage of error. In some configurations, the battery gauge 1554 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 1512 can also include a power connector, which can be combined with one or more of the aforementioned I/O components 1510. The power components 1512 can interface with an external power system or charging equipment via a power I/O component.

Example Clauses

The disclosure presented herein can be considered in view of the following clauses.

A. A device comprising: one or more processors; memory; one or more modules stored in the memory and executable by the one or more processors to perform operations comprising: detecting a gesture performed by or in association with a control object; identifying a target control point associated with a rendered object presented via a display of the device; tracking movement of the control object; causing the target control point to move with the movement of the control object; determining a displacement of the target control point from an original position to a new position, the new position based at least in part on the movement of the control object; altering a property of the rendered object based at least in part on the displacement; and modifying a rendering of the rendered object to reflect an alteration of the property.

B. A device as paragraph A recites, wherein a processor of the one or more processors is configured to identify a state of the control object based at least in part on a machine-learned algorithm and the operations further comprise: receiving a signal from the processor indicating the state; and detecting the gesture based at least in part on the signal.

C. A device as paragraph A or B recites, wherein the gesture is a pinch gesture.

D. A device as any of paragraphs A-C recite, wherein the target control point is a vertex of the rendered object, an edge of the rendered object, or a control that is proximate to the rendered object.

E. A device as any of paragraphs A-D recite, the operations further comprising: determining distances between the control object and a plurality of control points associated with the rendered object; and identifying the target control point based at least in part on determining that a distance between the control object and the target control object is a shortest distance of the distances.

F. A device as any of paragraphs A-E recite, the operations further comprising: determining that the target control point is a gaze target of a user associated with the device; and identifying the target control point based at least in part on determining that the target control point is the gaze target.

G. A device as any of paragraphs A-F recite, the operations further comprising: determining contextual data associated with the gesture; and identifying the target control point based at least in part on the contextual data.

H. A device as any of paragraphs A-G recite, the operations further comprising: determining a release of the gesture; and terminating tracking the movement of the control object.

I. A device as any of paragraphs A-H recite, wherein the movement comprises at least one of movement along an x-axis, movement along a y-axis, movement along a z-axis, rotation around the x-axis, rotation around the y-axis, or rotation around the z-axis.

J. A computer-implemented method for altering one or more properties of a first rendered object in a mixed reality environment via one or more control points associated with the first rendered object, the method comprising: detecting a gesture performed by or in association with a control object; identifying a target control point of the one or more control points, the target control point being within a threshold distance of the control object; tracking movement of the control object; causing the target control point to move with the movement of the control object; altering a first property of the first rendered object based at least in part on movement of the control object; and modifying a rendering of the first rendered object to reflect an alteration of the first property.

K. A computer-implemented method as paragraph J recites, wherein the property is a scale of the first rendered object.

L. A computer-implemented method as either paragraph J or K recites, wherein the property is a three-dimensional structure of the first rendered object.

M. A computer-implemented method as any of paragraphs J-L recite, wherein the property is a position of the first rendered object in a coordinate space.

N. A computer-implemented method as any of paragraphs J-M recite, wherein the property is a rotation of the first rendered object in a coordinate space.

O. A computer-implemented method as any of paragraphs J-N recite, wherein the property is mapped to or otherwise associated with the target control point.

P. A computer-implemented method as any of paragraphs J-O recite, wherein: a second property is mapped to or otherwise associated with the target control point; and the computer-implemented method further comprises: altering the second property of the first rendered object based at least in part on the movement of the control object; and modifying the rendering of the first rendered object to reflect an alteration of the second property.

Q. A computer-implemented method as any of paragraphs J-P recite, wherein: the target control point is further associated with a second rendered object in the mixed reality environment; and the computer-implemented method further comprises: altering the property of the second rendered object based at least in part on the movement of the control object; and modifying a rendering of the second rendered object to reflect an alteration to the property of the second rendered object.

R. A computer-implemented method as any of paragraphs J-Q recite, further comprising: determining a position of the control object relative to the target control point; and presenting feedback to guide the control object within a threshold distance of the target control point.

S. A device comprising one or more processors and one or more computer readable media encoded with instructions that, when executed by the one or more processors, configure a computer to perform a computer-implemented method as any of paragraphs J-R recite.

T. One or more computer-readable media encoded with instructions that, when executed by a processor, configure a computer to perform a method as any of paragraphs J-R recite.

U. A computer-implemented method for altering one or more properties of a first rendered object in a mixed reality environment via one or more control points associated with the first rendered object, the method comprising: means for detecting a gesture performed by or in association with a control object; means for identifying a target control point of the one or more control points, the target control point being within a threshold distance of the control object; means for tracking movement of the control object; means for causing the target control point to move with the movement of the control object; means for altering a first property of the first rendered object based at least in part on movement of the control object; and means for modifying a rendering of the first rendered object to reflect an alteration of the first property.

V. A computer-implemented method as paragraph U recites, wherein the property is a scale of the first rendered object.

W. A computer-implemented method as either paragraph U or V recites, wherein the property is a three-dimensional structure of the first rendered object.

X. A computer-implemented method as any of paragraphs U-W recite, wherein the property is a position of the first rendered object in a coordinate space.

Y. A computer-implemented method as any of paragraphs U-X recite, wherein the property is a rotation of the first rendered object in a coordinate space.

Z. A computer-implemented method as any of paragraphs U-Y recite, wherein the property is mapped to or otherwise associated with the target control point.

AA. A computer-implemented method as any of paragraphs U-Z recite, wherein: a second property is mapped to or otherwise associated with the target control point; and the computer-implemented method further comprises: means for altering the second property of the first rendered object based at least in part on the movement of the control object; and means for modifying the rendering of the first rendered object to reflect an alteration of the second property.

AB. A computer-implemented method as any of paragraphs U-AA recite, wherein: the target control point is further associated with a second rendered object in the mixed reality environment; and the computer-implemented method further comprises: means for altering the property of the second rendered object based at least in part on the movement of the control object; and means for modifying a rendering of the second rendered object to reflect an alteration to the property of the second rendered object.

AC. A computer-implemented method as any of paragraphs U-AB recite, further comprising: means for determining a position of the control object relative to the target control point; and means for presenting feedback to guide the control object within a threshold distance of the target control point.

AD. A computer-implemented method for altering one or more properties of a mixed reality environment via one or more control points associated with the mixed reality environment: detecting a gesture performed by or in association with a control object; identifying a target control point of the one or more control points, the target control point being within a threshold distance of the control object; tracking movement of the control object; causing the target control point to move with the movement of the control object; altering a property of the mixed reality environment based at least in part on movement of the control object; and modifying the mixed reality environment to reflect an alteration of the property.

AE. A computer-implemented method as paragraph AD recites, further comprising: determining a displacement of the target control point from an original position to a new position, the new position based at least in part on the movement of the control object; and altering the property of the mixed reality environment proportional to the displacement.

AF. A device comprising one or more processors and one or more computer readable media encoded with instructions that, when executed by the one or more processors, configure a computer to perform a computer-implemented method as paragraph AD or AE recites.

AG. One or more computer-readable media encoded with instructions that, when executed by a processor, configure a computer to perform a method as paragraph AD or AE recites.

AH. A computer-implemented method for altering one or more properties of a mixed reality environment via one or more control points associated with the mixed reality environment: means for detecting a gesture performed by or in association with a control object; means for identifying a target control point of the one or more control points, the target control point being within a threshold distance of the control object; means for tracking movement of the control object; means for causing the target control point to move with the movement of the control object; means for altering a property of the mixed reality environment based at least in part on movement of the control object; and means for modifying the mixed reality environment to reflect an alteration of the property.

AI. A computer-implemented method as paragraph AH recites, further comprising: means for determining a displacement of the target control point from an original position to a new position, the new position based at least in part on the movement of the control object; and means for altering the property of the mixed reality environment proportional to the displacement.

CONCLUSION

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A device comprising:
one or more processors;
memory;
one or more modules stored in the memory and executable by the one or more processors to perform operations comprising:
 presenting, in a three-dimensional coordinate space, a rendered object via a display of the device;
 detecting, in the three-dimensional coordinate space, a gesture performed by or in association with a control object;
 identifying, based at least in part on the gesture, a target control point from a plurality of control points, each control point of the plurality of control points displayed in a position that is associated with an edge or a vertex of the rendered object;
 tracking movement of the control object in the three-dimensional coordinate space;
 causing the target control point to move with the movement of the control object in the three-dimensional coordinate space;
 determining a displacement of the target control point from an original position to a new position in the three-dimensional coordinate space, the new position based at least in part on the movement of the control object;
 altering a property of the rendered object based at least in part on the displacement; and
 modifying a rendering of the rendered object to reflect an alteration of the property.

2. The device as claim 1 recites, wherein a processor of the one or more processors is configured to identify a state of the control object based at least in part on a machine-learned algorithm and the operations further comprise:
 receiving a signal from the processor indicating the state; and
 detecting the gesture based at least in part on the signal.

3. The device as claim 1 recites, wherein the device comprises a head-mounted device and the gesture comprises a pinch gesture that pinches the target control point in the three-dimensional coordinate space.

4. The device as claim 1 recites, the operations further comprising:
 determining distances between the control object and the plurality of control points; and
 identifying the target control point based at least in part on determining that a distance between the control object and the target control point is a shortest distance of the distances.

5. The device as claim 1 recites, the operations further comprising:
 determining that the target control point is a gaze target of a user associated with the device; and
 identifying the target control point based at least in part on determining that the target control point is the gaze target.

6. The device as claim 1 recites, the operations further comprising:
 determining contextual data associated with the gesture; and
 identifying the target control point based at least in part on the contextual data.

7. The device as claim 1 recites, the operations further comprising:
 determining a release of the gesture; and
 terminating tracking the movement of the control object.

8. The device as claim 1 recites, wherein the movement comprises at least one of movement along an x-axis, movement along a y-axis, movement along a z-axis, rotation around the x-axis, rotation around the y-axis, or rotation around the z-axis.

9. A computer-implemented method for altering one or more properties of a rendered object in a mixed reality environment, the computer-implemented method comprising:
 presenting the rendered object in a three-dimensional coordinate space;
 detecting, in the three-dimensional coordinate space, a gesture performed by or in association with a control object;
 identifying, by a processor, a target control point of a plurality of control points selected by the gesture, wherein each control point of the plurality control points is displayed in a position that is associated with an edge or a vertex of the rendered object and the target control point is within a threshold distance of the gesture performed by or in association with the control object;
 tracking movement of the control object in the three-dimensional coordinate space;

causing the target control point to move with the movement of the control object in the three-dimensional coordinate space;

altering a property of the rendered object based at least in part on the movement of the control object; and modifying a rendering of the rendered object to reflect an alteration of the property.

10. The computer-implemented method as claim 9 recites, wherein the property comprises a scale of the rendered object.

11. The computer-implemented method as claim 9 recites, wherein the property comprises a three-dimensional structure of the rendered object.

12. The computer-implemented method as claim 9 recites, wherein the property comprises a position of the rendered object in the three-dimensional coordinate space.

13. The computer-implemented method as claim 9 recites, wherein the property comprises a rotation of the rendered object in the three-dimensional coordinate space.

14. The computer-implemented method as claim 9 recites, wherein:

a second property is mapped to or otherwise associated with the target control point; and the computer-implemented method further comprises:

altering the second property of the rendered object based at least in part on the movement of the control object; and modifying the rendering of the rendered object to reflect an alteration of the second property.

15. The computer-implemented method as claim 9 recites, wherein:

the target control point is associated with a second rendered object in the mixed reality environment; and the computer-implemented method further comprises:

altering a property of the second rendered object based at least in part on the movement of the control object; and modifying a rendering of the second rendered object to reflect an alteration to the property of the second rendered object.

16. The computer-implemented method as claim 9 recites, further comprising:

determining a position of the control object relative to the target control point; and presenting feedback to guide the gesture performed by or in association with the control object to select the target control point.

17. A computer-implemented method for altering one or more properties of a mixed reality environment, the computer-implemented method comprising:

presenting an object in a three-dimensional coordinate space;

presenting a plurality of control points in a three-dimensional coordinate space, the plurality of control points positioned on an edge or a vertex of the object;

identifying, by a processor, a target control point of the plurality of control points, the target control point being within a threshold distance of a control object;

tracking movement of the control object in the three-dimensional coordinate space;

causing the target control point to move with the movement of the control object in the three-dimensional coordinate space;

altering a property of the object based at least in part on the movement of the control object; and modifying a rendering of the object to reflect an alteration of the property.

18. The device as claim 1 recites, wherein each of the plurality of control points are configured to alter a different property of the rendered object.

19. The computer-implemented method as claim 9 recites, wherein each of the plurality of control points are configured to alter a different property of the rendered object.

20. The computer-implemented method as claim 17 recites, wherein each of the plurality of control points are configured to alter a different property of the rendered object.

* * * * *